(12) United States Patent
Kassemi et al.

(10) Patent No.: US 10,860,993 B2
(45) Date of Patent: *Dec. 8, 2020

(54) ALTERNATIVE EMAIL-BASED WEBSITE CHECKOUTS

(71) Applicant: Swoop IP Holdings LLC, Wilmington, DE (US)

(72) Inventors: James Kassemi, Albuquerque, NM (US); John P. Killoran, Jr., Albuquerque, NM (US); Chad Person, Albuquerque, NM (US)

(73) Assignee: SWOOP IP HOLDINGS LLC, Wilmington, DE (US)

( * ) Notice: Subject to any disclaimer, the term of this patent is extended or adjusted under 35 U.S.C. 154(b) by 299 days.

This patent is subject to a terminal disclaimer.

(21) Appl. No.: 15/912,134

(22) Filed: Mar. 5, 2018

(65) Prior Publication Data

US 2018/0197228 A1    Jul. 12, 2018

Related U.S. Application Data

(63) Continuation of application No. 15/423,451, filed on Feb. 2, 2017, now Pat. No. 9,911,150, which is a (Continued)

(51) Int. Cl.
*G06Q 30/00* (2012.01)
*G06Q 20/12* (2012.01)
(Continued)

(52) U.S. Cl.
CPC ......... *G06Q 20/12* (2013.01); *G06Q 20/3823* (2013.01); *G06Q 30/0637* (2013.01); *G07G 1/0036* (2013.01)

(58) Field of Classification Search
None
See application file for complete search history.

(56) References Cited

U.S. PATENT DOCUMENTS 5,960,411 A    9/1999 Hartman et al.
6,360,254 B1   3/2002 Linden et al.
(Continued)

OTHER PUBLICATIONS

Postel, "Simple Mail Transfer Protocol", Information Sciences Institute University of Souther California, Aug. 1982 (Year 1982).
(Continued)

*Primary Examiner* — Michael Misiaszek
*Assistant Examiner* — Timothy J Kang
(74) *Attorney, Agent, or Firm* — Volpe Koenig

(57) ABSTRACT

An e-commerce system and method for facilitating transactions between a customer and a vendor is disclosed. The e-commerce system includes a receiver configured to receive a request for at least one token, the request including the details of at least one transaction for the purchase of at least one product, a processor configured to generate at least one token, a transmitter configured to transmit the at least one token to a customer browser, the customer browser being used to validate the token using at least one iframe, the receiver configured to receive submission in the iframe, the processor configured to decode the token, the processor configured to perform one or more validations, and the processor configured to process the transaction, on a condition that the validations are approved.

20 Claims, 17 Drawing Sheets

Related U.S. Application Data continuation of application No. 14/582,071, filed on Dec. 23, 2014, now abandoned.

(60) Provisional application No. 61/920,039, filed on Dec. 23, 2013, provisional application No. 61/920,278, filed on Dec. 23, 2013, provisional application No. 62/096,440, filed on Dec. 23, 2014.

(51) Int. Cl.
*G06Q 30/06* (2012.01)
*G06Q 20/38* (2012.01)
*G07G 1/00* (2006.01)

(56) References Cited

U.S. PATENT DOCUMENTS

| | | |
|---|---|---|
| 7,177,825 B1 | 2/2007 | Borders et al. |
| 7,257,536 B1 | 8/2007 | Finley et al. |
| 8,606,703 B1 | 12/2013 | Dorsey et al. |
| 8,725,635 B2 | 5/2014 | Klein et al. |
| 8,762,272 B1 | 6/2014 | Cozens et al. |
| 9,652,769 B1 | 5/2017 | Golin |
| 9,911,150 B2 * | 3/2018 | Kassemi ................ G06Q 20/12 |
| 10,395,223 B2 | 8/2019 | Muthu et al. |
| 10,515,345 B2 | 12/2019 | Koh et al. |
| 2009/0006233 A1 | 1/2009 | Chemtob |
| 2009/0144161 A1 | 6/2009 | Fisher |
| 2009/0282108 A1 | 11/2009 | Sachtjen et al. |
| 2010/0094755 A1 | 4/2010 | Kloster |
| 2012/0116967 A1 | 5/2012 | Klein et al. |
| 2012/0253896 A1 * | 10/2012 | Killoran, Jr. ......... G06Q 10/107 705/14.4 |
| 2012/0290490 A1 | 11/2012 | Young |
| 2013/0198018 A1 | 8/2013 | Baig |
| 2013/0318348 A1 | 11/2013 | Lebron |
| 2015/0304250 A1 | 10/2015 | Zomet et al. |

OTHER PUBLICATIONS

First Data, "How Multi-Pa Tokens Can Reduce Secrity Risks and the PCI Compliance Burden for eCommerce Merchants," 2012 (Year: 2012).

* cited by examiner

2-Click Web Without Hosted Token Generator

ALTERNATIVE EMAIL-BASED WEBSITE CHECKOUTS

CROSS REFERENCE TO RELATED APPLICATIONS

This Application is a Continuation of U.S. patent application Ser. No. 15/423,451, filed Feb. 2, 2017, which is a Continuation of U.S. patent application Ser. No. 14/582,071 filed Dec. 23, 2014, abandoned, which claims the benefit of U.S. Provisional Application No. 61/920,039 filed Dec. 23, 2013 entitled TWO-CLICK WITHOUT WEB-HOSTED GENERATOR; U.S. Provisional Application No. 61/920,278 filed Dec. 23, 2013 entitled ELECTRONIC SHOPPING BAG; and U.S. Provisional Application No. 62/096,440 filed Dec. 23, 2014 entitled EMAIL ADDRESS TOKEN INTEGRATION, which applications are incorporated by reference as if fully set forth.

FIELD OF INVENTION

The present invention is related to web-based e-commerce systems. More particularly, the present invention is a system and method that improves the URL based checkout by providing alternative email-based website checkouts.

BACKGROUND

Online shopping has become a staple of how customers purchase goods and services. Shopping in brick and mortar stores is quickly giving way to the capacity to use online technology to offer and buy products. All manner of merchandise may be found online from clothing to food, experiences and access to other network and data. This trend will only continue to grow as will the need for businesses to implement new technology and offer their customers less complicated ways to purchase.

Shopping online is often the customer's ideal way to locate a product that they wish to purchase. The online shopping universe is also an ideal way to compare prices and find comparable products. However, the process of actually filling in the needed information in order to finalize the purchase often takes more time as compared to that in a brick and mortar store. The need to input data, such as name, credit card, email address and delivery location creates a delay that may be frustrating for customers. The need to create a password or remember a password is also a source of frustration for prospective customer.

Before the advent of online shopping, delays like this were nonexistent since there was no need to enter this type of information, and frustration with passwords were nonexistent since passwords themselves were nonexistent. Businesses now strive to duplicate the easy purchasing process in the online world. This has led to the need for many vendors to focus on eliminating steps in the process of finalizing a purchase by storing much of the information needed for transactions and remembering customers when they are shopping on websites. Further, the click or the tap of the screen is the irreducible unit of user interaction. The number of times a customer needs to click their mouse or tap their screen has come to define the amount of time and effort asked of the shopper. A reduction in the number of steps to complete a transaction is preferred by vendors and customers.

Throughout online shopping environments a customer will find various manifestations of checkouts that promise a limited number of clicks. The "two-click" or even "one-click" checkout promises the shopper the minimum action to complete a transaction. The end goal of this process is to expedite the final transaction and to minimize any delays in a purchase. As e-commerce technologies advance it is important to maintain this ease while assuring the security of the transaction. Currently, many businesses and organizations struggle with these improvements and for many it has given an edge to their competitors. One reason is that integrating such changes may be complicated as well as time consuming and expensive.

The functionality of minimizing the steps in a web-based checkout, especially when offered in conjunction with an email checkout, has high desirability in the marketplace to reduce the barriers to payment completion. All vendors are dependent on their customers completing their purchases as soon as possible; any purchase left incomplete is a lost opportunity for revenue. With the ability for a customer to checkout in the fewest number of clicks, without having to enter payment information a second time, the checkout process has become far simpler and easier for a customer to complete.

SUMMARY

The methods and system described herein allow for a minimum number of clicks per online transaction while maintaining a secure environment. For the host business providing the service, this entails less setup and integration than in previous versions found in the industry but produces the same result for the customer. This method improves the URL based checkout set-up process found throughout the e-commerce environment. A vendor generates a unique token for facilitating a minimum number of clicks. In one example, all tokens are generated on the e-commerce system's servers.

The methods and apparatus described herein allow for the email-based payment technology to function within a web-based checkout. Customers that have completed a selection of products may generate a total of their purchases and can select a confirmation of payment button that generates a response email. Instead of completing the payment by HTTP, an email is generated to complete the transaction.

The methods and apparatus described herein reduce the delay in purchasing products when shopping online. The use of shopping carts on e-commerce websites requires the customer to make the decision to purchase twice; first when they choose to put the product in the shopping cart and second when they decide to actually pay for the product, services or donations. With direct-to-purchase method, the customer only makes the decision once. The direct-to-purchase method provides a running total of money being spent and provides the option for the customer to "Cancel" individual line items. An image of a shopping bag appears in the corner of the webpage so the customer can see the contents of the bag. The timing of when the transaction is submitted for processing may be determined by the vendor. The payment may be submitted at any point in the process or may occur automatically when the customer logs out.

A method implemented in an e-commerce system to facilitate transactions between a customer and a vendor is disclosed. The method includes receiving, by a receiver, a request for at least one token, the request including the details of at least one transaction for the purchase of at least one product; generating, by a processor, the requested at least one token; transmitting, by a transmitter, the at least one token to a customer browser, the customer browser being used to validate the token using at least one iframe;

receiving, by a receiver, a submission in the iframe; performing, by the processor, a validation of the submission to the iframe; decoding, by the processor, the token; and processing, by the processor, the transaction, on a condition that the validation is approved. The method may include the details of at least one transaction for the purchase of at least one product, based on customer selected items for checkout. The method may also calculate the amount of the transaction with the processor and may transmit a confirmation email message to a customer.

An e-commerce system to facilitate transactions between a customer and a vendor is disclosed. The e-commerce system includes a receiver configured to receive a request for at least one token, the request including the details of at least one transaction for the purchase of at least one product, a processor configured to generate at least one token, a transmitter configured to transmit the at least one token to a customer browser, the customer browser being used to validate the token using at least one iframe, the receiver configured to receive submission in the iframe, the processor configured to decode the token, the processor configured to perform a validation, and the processor configured to process the transaction, on a condition that the validation is approved.

BRIEF DESCRIPTION OF THE DRAWINGS

A more detailed understanding may be had from the following description, given by way of example in conjunction with the accompanying drawings wherein.

DETAILED DESCRIPTION

Figure 1:
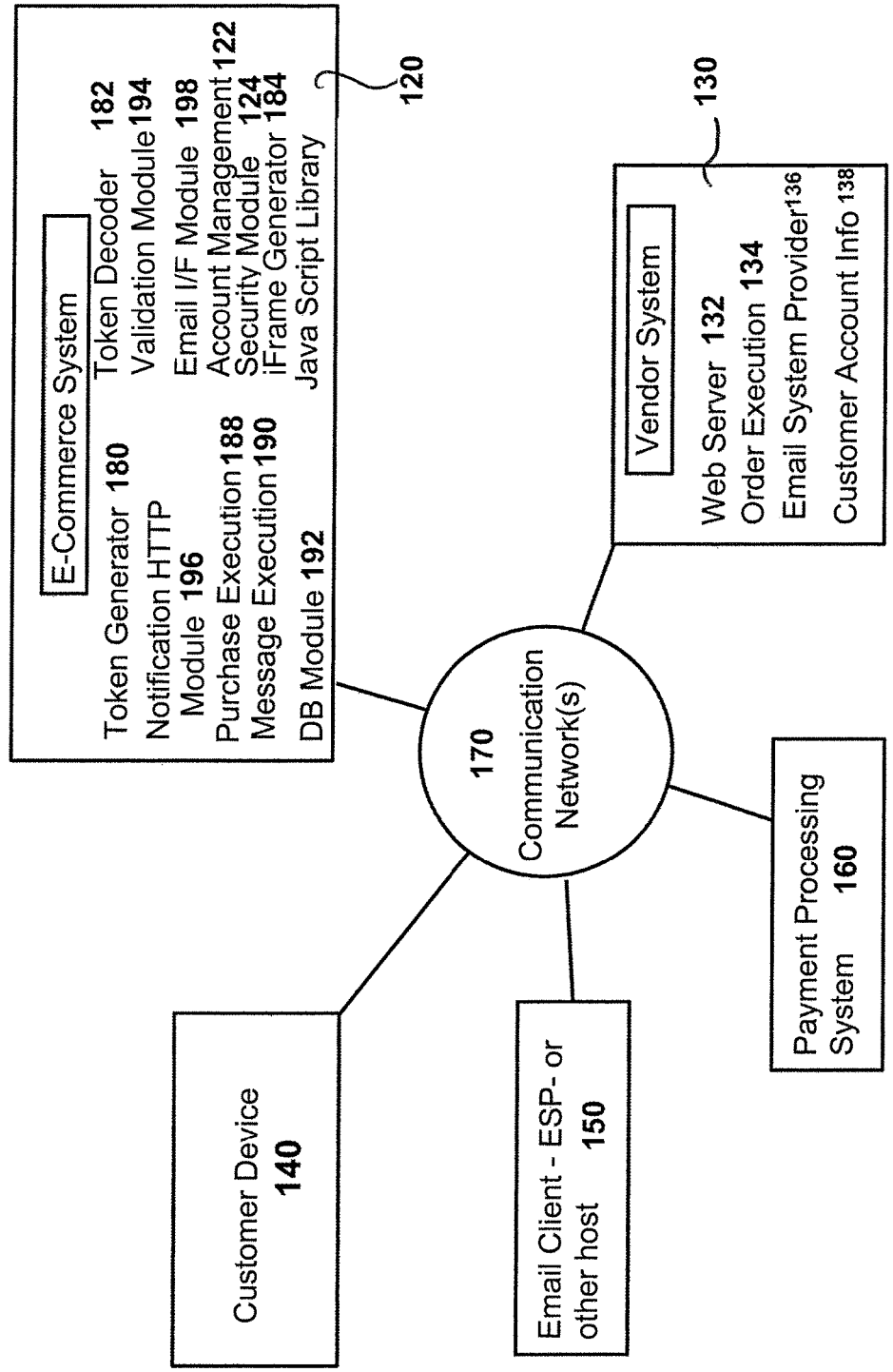
FIG. 1 illustrates a system diagram of an email-based website checkout system.

The embodiments described below may be used in tandem or in relation to specific vendor needs. They may also be integrated with an email service provider (ESP) or directly with a payment processor. Payment processing may occur in a number of ways using multiple gateways, credit cards, debit cards, direct carrier billing and/or an automatic clearing house. Although the description below focuses on the use of email messaging, social media networks may also be substituted. The configuration of the system may vary based on client needs. However, for the purposes of this application FIG. 1 represents one possible configuration.

Many current websites have clunky multi-step checkout processes, which reduce conversions and increase shopping cart abandonment. While there are solutions that allow the functionality those vendors' want, these solutions have been hindered in their adoption rate because of integration difficulties. In previous solutions, the client was burdened with extensive setup that may take days if not weeks.

The methods and apparatus described herein provide a streamlined process of limited user steps or "clicks". The present web checkout offers a minimum number of clicks thereby providing a feature that many businesses wish to offer to their customers. The described e-commerce system makes acquiring this feature a less burdensome process. It simplifies a complicated set-up process and it takes less time. While online shoppers have come to expect more streamlined checkout experience, integrating those innovations into a businesses' online infrastructure has not proven to be an easy or an accommodating a process.

Currently a vendor needs to generate a unique token on their systems in order to set up a minimum-of-clicks web checkout method on their websites for their business. Minimum-of-clicks web checkout has been available through an e-commerce system's API with the use of a "site token"—a value generated by a vendor's server with a private key value known only to them (targeting an e-commerce system's public key), information about the desired transaction amount, and information about the customer's browser that is making the request to purchase. This information is encrypted, and when passed back to an e-commerce system's servers, decrypted using the e-commerce system's private key. After verifying that the browser information in the token matches the browser information the e-commerce system received from the payment request, the e-commerce system executes the transaction. This provides protection from a malicious alteration of the destination of funds by an attacker executing an XSS vulnerability against a vendor site, and protection from a rogue vendor, in that the transaction was executed on the e-commerce system by the request of the paying customer and not the request of the vendor. This existing process demands that a client needed to generate a unique token on their systems in order to set up a minimum-of-clicks service.

Implementing a minimum-of-clicks web checkout method has proven to be challenging for some vendors that are unable or unwilling to incorporate the token generator into their systems. This may result from different coding language incompatibilities, system restrictions on external code, limited programming resources, or other internal factors. As a result, an alternative solution is necessary to ease implementation and increase the real availability of this functionality.

The methods and apparatus described herein allow for a secure minimum-of-clicks transaction. However, for the host business providing the service this entails vastly less setup and integration than in previous systems found in the industry while producing the same result for the customer. This method improves the URL based checkout set-up process found throughout the e-commerce environment. This also improves email-based transactions. A vendor typically generates a unique token on their systems if they wish to provide their customers with a minimum-of-clicks service. As described herein, tokens may be generated on the e-commerce system's servers. The methods and apparatus described herein provide new methods for checking out, donating or paying a bill.

The methods and apparatus described herein may also include a direct-to-purchase process that reduces the delay in purchasing products when shopping online. The use of shopping carts on e-commerce websites requires the customer to make the decision to purchase twice; first when they choose to put the product in the shopping cart and second when they decide to actually pay for the product, services or donations. With a direct-to-purchase method, the customer only makes the decision once. The customer may choose to buy the product once, and it is purchased and put in the bag. The direct-to-purchase method provides a running total of money being spent and provides the option for the customer to "Cancel" individual line items. An image of a shopping bag appears in the corner of the webpage so the customer is provided with the information regarding the content of the shopping bag. When the transaction is submitted for processing may be determined by the merchant. The payment may be submitted at any point in the process or may occur automatically when the customer logs out.

FIG. 1 illustrates a system diagram of an email-based website checkout system 100. The example system 100 shown in FIG. 1 may be used for e-commerce transactions. The example system 100 includes a vendor system 130, an e-commerce system 120, a customer device 140, a banking server (not shown), an email service provider 150, and a payment processing system 160 that may communicate over one or more wired and/or wireless communication networks 170. The wired or wireless communication networks 170 may be public, private or a combination of public or private networks.

The customer device 140 may be, for example, a cellular phone, a smartphone, a desktop computer, a laptop computer, a tablet computer, or any other appropriate computing device. The customer device 140 includes a processor, memory, a web browser unit that may communicate data to/from the web server module(s) in the vendor system 130 and e-commerce system 120, an email client, a scanner application and a cashier application. The web browser unit may include and/or communicate with one or more sub-modules that perform functionality such as rendering HTML (including but not limited to HTML5), rendering raster and/or vector graphics, executing JAVASCRIPT, and/or rendering multimedia content.

Alternatively or additionally, the web browser unit may implement Rich Internet Application (RIA) and/or multimedia technologies such as ADOBE FLASH and/or other technologies compatible with Internet based communications. The web browser unit may implement RIA and/or multimedia technologies using one or web browser plug-in modules (e.g., ADOBE FLASH), and/or using one or more sub-modules within the web browser unit itself. The web browser unit may display data on one or more display devices that are included in, or connected to, the customer device 140, such as a liquid crystal display (LCD) display or monitor. The customer device 140 may receive input from the customer of the customer device 140 from input devices (not depicted) that are included in, or connected to, the customer device 140, such as a keyboard, a mouse, a microphone or a touch screen, and provide data that indicates the input to the web browser unit 242.

The vendor system 130 may include a web server 132, an order execution unit 134, a processor (not shown), memory (not shown), a customer account information database 138, and an email system provider 136.

The web server 132 provides a website that may be accessed by a customer device 140. The web server 132 may implement the HTTP protocol, and may communicate Hypertext Markup Language (HTML) pages and related data from the website to/from the customer device 140 using HTTP. The vendor system 130 may be connected to one or more private or public networks (such as the Internet), via which the web server 132 communicates with devices such as the customer device 140. The web server 132 may generate one or more web pages and may communicate the web pages to the customer device 140, and may receive responsive information from the customer device 140.

The vendor system 130 may also include one or more additional components or modules (not depicted), such as one or more load balancers, firewall devices, routers, switches, and devices that handle power backup and data redundancy.

The order execution unit 134 is configured to receive instructions included in received messages and executes orders on behalf of the vendor system 130. The orders may be for purchasing of goods, making a donation or processing a financial transaction The memory (not shown) may be configured to store information associated with e-commerce transactions. This may include inventory information, information used to generate web pages, customer information, and other e-commerce data.

The email system provider 136 may access and manage the vendor system's 130 email.

The e-commerce system 120 may include a token generator 180, an iframe generator 184, a purchase execution module 188, a message execution module 190, a database module 192, a token decoder 182, a validation module 194, a notification HTTP module 196, an email interface module 198, an account management unit 122 and a security module 124. While only one vendor system 130 is shown communicating with the e-commerce system 120, this is shown as an example only. The e-commerce system 120 may communicate with an internal or external email service provider (ESP) 150 and an internal or external payment processing system 160. The e-commerce system 120 may communicate with multiple vendor systems 130. Similarly, vendors may register with the e-commerce system 120. The e-commerce system 120 may provide the vendor system 130 with a public key and private key to be used in token transaction in accordance with the methods described herein. When a transaction is attempted (e.g. for invoices and payments), the e-commerce system 120 decodes the token, authenticates the sender of the email, which may allow the transaction to be processed. While the e-commerce system 120 is depicted as a separate entity in FIG. 1, this is shown as an example only. The e-commerce system 120 may be controlled and/or co-located with the vendor system 130, and/or the email service provider 150.

The token generator 180 may generate tokens for use in e-commerce transactions. Tokens may be encrypted or plain text strings which contain information to perform a transaction when sent to the e-commerce system(s) 120. A token may be one or multiple encrypted strings, files, passwords, cyphers, plain text or other data which may contain information used to perform or authenticate a transaction. While FIG. 1 shows the token generator 180 as being a part of the e-commerce system 120, it may be hosted by any trusted party with access to the private key. For example, the banking server may include a token generator 180. A token may include one or more of the following parameters or other parameters not listed below:

private-key: The private key provided by the e-commerce system 120.

public-key: e-commerce system's 120 public key, provided by the e-commerce system 120.

auth-key: any additional data that may be used to authenticate the transaction, including, but not limited to, biometric identification, location data and other fraud detection systems.

partner-id: The partner ID given provided by the e-commerce system 120.

environment: The environment the vendor wants to generate buttons for. This distinguishes whether the token is being used in a testing environment or in the live environment (and running real transactions).

type: The type of token to generate (e.g. bulk, email-targeted, etc.). There are multiple types of tokens that a token generator may generate and decode. For example, site tokens may be used for website transactions, email tokens for minimum-of-clicks email payments, and universal tokens for email validations.

card: The card token associated with the recipient of this token. When a customer is registered with the e-commerce system 120, the vendor receives a credit card token—a unique identifier that references the specific card associated with that customer and vendor. When the vendor is generating a token to submit to e-commerce system 120, they may include the card token as a customer identifier.

email: The email associated with the receipt of this token.

URL: The Signup URL the recipient may go to if customer doesn't have payment information registered with e-commerce system 120.

amount: The amount a customer should be charged for the transaction the token is generated for.

user-data: Data to pass back as a reference. This data may include custom data that the vendor may want to pass through the e-commerce system 120 and receive back when a transaction has completed. It may include an item reference number or SKU, customer address, or other piece of data that is not required by e-commerce system 120 to complete a transaction, but that the vendor wants associated with that transaction.

expires: Expiration date for token, integer value of seconds since epoch.

header-user-agent: The HTTP_USER_AGENT from the request header. HTTP headers are sent as part of a request from a customer's web browser unit within customer device 140 for a piece of information. These headers define the parameters that the web browser unit is expecting to get back. The user-agent is the identifier of the software that is submitting the request—typically the identifier of the web browser unit that is requesting the content.

header-accept-language: The HTTP_ACCEPT_LANGUAGE from the request header. The accept-language is the acceptable language for the response—e.g. the language in which the web browser unit is requesting the content be sent back.

header-accept-charset: The HTTP_ACCEPT_CHARSET from the request header. The accept-charset is the character sets that are acceptable for the response—e.g. the character set in which the web browser unit is requesting the content be sent back.

ip-address: The IP address of the token recipient.

In one example, a bulk token may omit the card and email fields, allowing for the tokens to be shared. Additionally, or alternatively, a bulk token may include the card field and/or email field but the e-commerce system 120 may be configured to ignore those fields and/or other fields based on the type field.

The purchase execution module 188 facilitates the execution of purchases between a customer and a vendor.

The message execution module 190 is configured to analyze received messages and communicate with the token decoder 182 to determine if the received message is valid and to identify the request embedded in the message (e.g. request for purchase of goods.) If the token decoder 182 indicates the token is valid, the message execution module 190 may then access the account management unit 122 to verify a transaction.

The database module 192 serves as a database to store information that may be accessed by the e-commerce system 120.

The token decoder 182 may be configured to decode tokens received from external sources, such as a vendor system 130 or a customer device 140.

The validation module 194 may serve to authenticate received emails, using the DomainKeys Identified Mail (DKIM) and/or Sender Policy Framework (SPF) protocols. For example, SPF allows a domain owner to add a file or record on the server that the recipient server cross-checks. Similarly DKIM may be used to embed information within the email. While these specific validation/authentication protocols are discussed herein, any known validation/authentication protocol may be used and the use of the DKIM/SPF protocol is used only to enhance the understanding of the reader by using a specific possible validation/authentication protocol.

Generally, SPF is an email validation system designed to detect email spoofing by providing a mechanism to allow receiving mail exchangers to check that incoming mail from a domain is being sent from a host authorized by that domain's administrators. The list of authorized sending hosts for a domain may be published in the Domain Name System (DNS) records for that domain in the form of a specially formatted TXT record. Sender Policy Framework is described in IETF publication RFC 7208, which is incorporated by reference as if fully set forth.

The Simple Mail Transfer Protocol (SMTP) permits any computer to send email claiming to be from any source address. SPF allows the owner of an Internet domain to specify which computers are authorized to send mail with sender addresses in that domain, using Domain Name System (DNS) records. Receivers verifying the SPF information in TXT records may reject messages from unauthorized sources before receiving the body of the message.

The sender address is transmitted at the beginning of the SMTP dialog. If the server rejects the sender, the unauthorized client should receive a rejection message, and if that client was a relaying message transfer agent (MTA), a bounce message to the original sending address may be generated. If the server accepts the sender, and subsequently also accepts the recipients and the body of the message, it should insert a Return-Path field in the message header in order to save the sender address.

Generally, DKIM is an email validation system designed to detect email spoofing by providing a mechanism to allow receiving mail exchangers to check that incoming mail from a domain is authorized by that domain's administrators. A digital signature included with the message may be validated by the recipient using the signer's public key published in the DNS. DKIM is the result of merging DomainKeys and Identified Internet Mail. Prominent email service providers implementing DKIM include Yahoo, Gmail, AOL and Fast-Mail. Any mail from these organizations should carry a DKIM signature.

More specifically, both modules, signing and verifying, are usually part of a mail transfer agent (MTA). The signing organization may be a direct handler of the message, such as the author, the originating sending site or an intermediary along the transit path, or an indirect handler such as an independent service that is providing assistance to a direct handler. In most cases, the signing module acts on behalf of the author organization or the originating service provider by inserting a DKIM-Signature: header field. The verifying module typically acts on behalf of the receiver organization.

DKIM is independent of Simple Mail Transfer Protocol (SMTP) routing aspects in that it operates on the RFC 5322 message—the transported mail's header and body—not the SMTP envelope defined in RFC 5321. Hence the DKIM signature survives basic relaying across multiple MTAs. DKIM allows the signer to distinguish its legitimate mail stream. This ability to distinguish legitimate mail from potentially forged mail has benefits for recipients of e-mail as well as senders, and "DKIM awareness" is programmed into some e-mail software.

The "DKIM-Signature" header field, by way of example, may include a list of "tag=value" parts. Tags are short, usually only one or two letters. The most relevant ones are b for the actual digital signature of the contents (headers and body) of the mail message, bh for the body hash, d for the signing domain, and s for the selector. The default parameters for the authentication mechanism are to use SHA-256 as the cryptographic hash and RSA as the public key encryption scheme, and encode the encrypted hash using Base64. The receiving SMTP server uses the domain name and the selector to perform a DNS lookup. For example, given the signature:

DKIM-Signature: v=1; a=rsa-sha256; d=example.net; s=brisbane;
c=relaxed/simple; q=dns/txt; l=1234; t=1117574938; x=1118006938;
h=from:to:subject:date:keywords:keywords;
h=MTIzNDU2Nzg5MDEyMzQ1Njc4OTAxMjM0NTY3ODkwMTI=;
b=dzdVyOfAKCdLXdJOc9G2q8LoXSlEniSbav+yuU4zGeeruD00lszZ
VoG4ZHRNiYzR.

A verifier queries the TXT resource record type of brisbane._domainkey.example.net. The selector is a straightforward method to allow signers to add and remove keys whenever they wish—long lasting signatures for archival purposes are outside DKIM's scope. Some more tags are visible in the example:

v is the version,
a is the signing algorithm,
c is the canonicalization algorithm(s) for header and body,
q is the default query method,
l is the length of the canonicalized part of the body that has been signed,
t is the signature timestamp,
x is its expire time, and
h is the list of signed header fields, repeated for fields that occur multiple times.

The DKIM-Signature header field itself is always implicitly included in h.

The data returned from the query is also a list of tag-value pairs. It includes the domain's public key, along with other key usage tokens and flags. The receiver may use this to then decrypt the hash value in the header field and at the same time recalculate the hash value for the mail message (headers and body) that was received. If the two values match, this cryptographically proves that the mail was signed by the indicated domain and has not been tampered with in transit.

Signature verification failure does not force rejection of the message. Instead, the precise reasons why the authenticity of the message may not be proven should be made available to downstream and upstream processes. Methods for doing so may include sending back a message, or adding an Authentication-Results header field to the message as described in RFC 7001, which is incorporated as if fully set forth.

While DKIM and SPF protocols are discussed herein, validation module 194 may perform any authentication and validation type protocols. DKIM and SPF are used to provide examples of such validation protocols that may be performed in validation module 194.

The notification HTTP module 196 delivers notices of events to external systems, such as an HTTP endpoint the vendor configures to update their internal database when a transaction is executed.

An email interface module 198 may be configured to parse emails for action by the e-commerce system 120.

The account management unit 122 is configured to manage accounts registered with the e-commerce system 120. A customer or vendor, wishing to complete a transaction with an e-commerce system 120 may register his/her email address and payment information with the e-commerce system 120. The account management unit 122 may be configured to store a customer registry and a vendor registry.

The security module 124 may be configured to perform additional security measures to prevent unauthorized access to the system or fraud.

Inline frame (iframe) generator 184 may be used to embed another document within a current HTML document. Specifically, iframe generator 184 is an HTML document embedded inside another HTML document on a website, for example. The iframe generator 184 HTML element may be used to insert content from another source, such as e-commerce system 120, into a Web page. Although an iframe generator 184 behaves like an inline image, iframe generator 184 may be configured with its own scrollbar independent of the surrounding page's scrollbar. Iframe generators 184 are windows "cut into a" webpage that allow the visitor to that webpage to view another page from the e-commerce system 120 without reloading the entire page.

The email service provider 150 may be associated with the vendor system 130, the e-commerce system 120, or may be a third party entity. The email service provider 150 may be configured to provide email marketing services. The email service provider 150 may further be configured to provide tracking information showing the status of email sent to each member of an address list. The email service provider 150 may further be configured to segment an address list into interest groups or categories to send targeted information. The email service provider 150 may also parse messages based on the secondary system of email targeted tokens. The email service provider 150 may also be configured to send trigger emails based on responses from the vendor system 130 or customer behavior. The email service provider 150 may further be configured to create or use templates generated by the e-commerce system 120 for sending to contacts and/or the use of templates, email service provider 150 may include a user interface that allows a user to adjust the template or it may be integrated with external sources (e.g. vendor system 130 or e-commerce system 120). The email service provider 150 may comprise a send engine, which allows vendors to distribute their message that may be received by one or more customer device(s) 140. The email service provider 150 may further include a tool for generating mailto links, graphic buttons, and tokens. The email service provider 150 may be configured to dynamically customize the content of emails that are sent out, to tailor personalized information and mailto links.

The banking server (not shown) may be controlled by a third party system bank. The e-commerce system 120 may communicate with the banking server to verify that the customer has adequate funds or credit for the requested purchase. For example, the banking server may be a controlled by VISA, AMERICAN EXPRESS, MASTERCARD or any other bank or banking or financial network that a customer may use for online payment. The banking server may be an automatic clearing house services (ACS). The banking server may be an interface for a centralized or decentralized virtual currency system or protocol such as frequent flyer miles, "reward" points, or Bitcoin.

In one embodiment, the email-based e-commerce system 120 may allow vendors to send advertising emails or bills with a mailto link associated with a specific product offer (or payment amount) and select the mailto link and generate a response email by selecting the mailto link. This response email contains a token and is addressed to the e-commerce system 120. Once sent, this response email confirms the customer's purchase of the product (or prepayment of a bill) by parsing the information in the token. The e-commerce system 120 processes the payment and notifies the vendor system 130 and the customer device 140. The e-commerce system 120 may comprise a token generator 180 as well as components for processing the tokens and a components for processing the payments and a system for notifying the vendor system 130 of the transaction details Referring back to the example system in FIG. 1, the payment processing system 160 may be an independent third party operated unit, it may be located in the e-commerce system 120 or the vendor system 130.

While the example system shown in FIG. 1 shows the e-commerce system 120 comprising the token generator 180, this is shown as an example only. The vendor system 130 may also include a token generator that allows vendors to directly create tokens. In another example, a third party may have a token generator to create tokens for use by the vendor system 130.

System 100 may not require the vendor to host the token generator 180 on their system. System 100 uses the web browser's ability to transmit a message securely between two frames of a page and validating the URLs of those two pages.

Mailto links in the email messages may include one or any combination of the following fields: a "mailto:" and/or "to" field that indicate one or more email addresses of recipients of the new message; a "Copy To" or "CC" field that indicates one or more email addresses of recipients to whom a copy of the new message should be sent; a "Blind Copy To" or "BCC" field that indicates one or more email addresses of recipients to whom a "blind" copy of the new message should be sent; a field that indicates the subject of the new message; and a field that indicates the body of the new message. The mailto links may be defined according to the format described in Internet Engineering Task Force (IETF) RFC2368, which is incorporated by reference as if fully set forth herein.

Figure 1A:
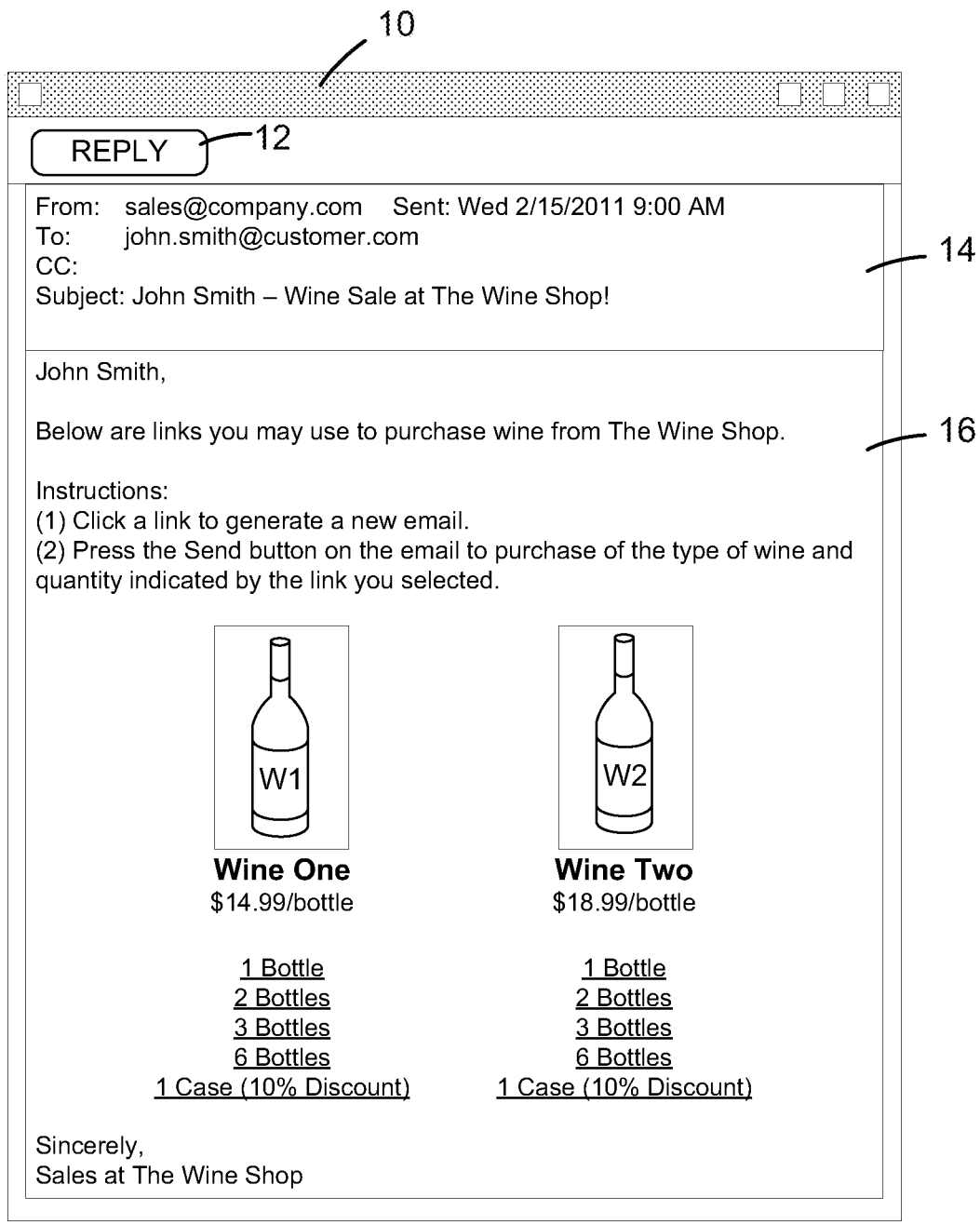
FIG. 1a illustrates an example advertisement email message that solicits the purchase of goods from a vendor system.

In order to aid in understanding the present description, and for completeness, FIG. 1a illustrates an example email message that solicits the purchase of goods from a vendor. FIG. 1a shows an email display window 10 that may be used by the email client module of customer device 140 to display a first example email message from the message processing module. The email display window 10 may include a reply button 12, a control area 14, and a message body area 16. The control area 14 may display control and/or header information associated with the email message, such as the email addresses of the sender and recipient of the message. According to this example, the control area 14 shows that the sender of the message has the email address "sales@company.com." This is an email address that may be associated with an account used by the e-commerce system 120 for the communication of email messages. Further to this example, the control area 14 shows that the email address of the example recipient of the message (John Smith) is "john.smith@customer.com." The control area 14 may also display information such as a subject of the email message and the time the email message was sent. The reply button 12 may respond to user input to generate a new display element (not depicted) to respond to the email message.

The message body area 16 may display the body of the email message. As shown in FIG. 1a, the message body area 16 may display an example email message that shows information related to two example products (Wine One and Wine Two) that are being offered for sale by an example vendor (The Wine Shop). The message body area 16 includes a picture of a bottle of each type of wine, as well as the price for a bottle of each type of wine. The message body area 16 also includes, under the picture of the bottle of Wine One, a number of mailto links, such as the "1 Bottle," "2 Bottles," "3 Bottles", "6 Bottles," and "1 Case (10 percent Discount)" links. The message body area 16 also includes similar links under the picture of the bottle of Wine Two. These links may be defined according to the mailto URI scheme or other appropriate format, and each may describe a new email message that may be generated by the email client module of customer device 140 when that link is selected.

The "1 Bottle" link beneath the picture of the Wine One bottle may include information that, if selected, generates an email message that, if received by the e-commerce system 120, will indicate to the e-commerce system 120 that John Smith may like to purchase one bottle of Wine One. As a further example, Wine One may have a product identifier of "0005," and John Smith may have a customer identifier of "0777." According to this example, the "1 Bottle" link may describe an email message that is addressed to an email account that is associated with the e-commerce system 120, and that includes a message body that includes the identifier for John Smith ("0777"), an identifier of the selected product ("0005"), and an identifier of the quantity that John Smith may like to order (in this example, a single bottle). Alternatively or additionally, the email message described by the link may include information such as text that describes the order, an identifier of the vendor (in this example, The Wine Shop), an email campaign identifier, and/or other information. Similarly, the "2 Bottles" link beneath the picture of the Wine One bottle may include information that describes an email message that, if received by the e-commerce system 120, will indicate to the e-commerce system 120 that John Smith may like to purchase two bottles of Wine One. According to this example, the "2 Bottles" link may be defined as follows:

<a href="mailto:sales@company.com?
subject=Purchase percent 20from percent 20Wine percent 20Shop percent 20 and
body=You percent 20have percent 20created percent 20an percent 20order percent 20for percent 20two percent 20bottles percent 20o
f percent 20Wine percent 20One. percent 20Press percent 20the percent 20Send percent 20button percent 20to percent 20complete percent
20the percent 20order. percent 0A percent 0AProductID0005 percent 20QualifierNA percent 20Qty0002 percent 20Cus
tomerID0777 percent 20CampaignID0003"
target="_blank">2 Bottles</a>
mailto:sales@company.com?Subject="Press send to pay $29.98 to Wine Shop"? body="TEXT XXX-XXX-XXX-XXX"

Similarly, the "3 Bottles," "6 Bottles," and "1 Case (10 percent Discount)" links beneath the picture of the Wine One bottle indicate corresponding information for three bottles, six bottles, and one case of bottles, respectively. Additionally, the "1 Bottle," "2 Bottles," "3 Bottles," "6 Bottles," and "1 Case (10 percent Discount)" links under the Wine Two bottle indicate corresponding information for Wine Two as that described above with respect to the mailto links relating to Wine One.

The email client module of customer device 140 may receive a user input that indicates that one of the links displayed in the message body area 16 is selected. The user input may be, for example, a mouse click, keyboard input, or any other type of input that indicates that a link is selected. The email client module of customer device 140 may, in response to this user input, generate and display an order email message as specified by the selected link.

Figure 1B:
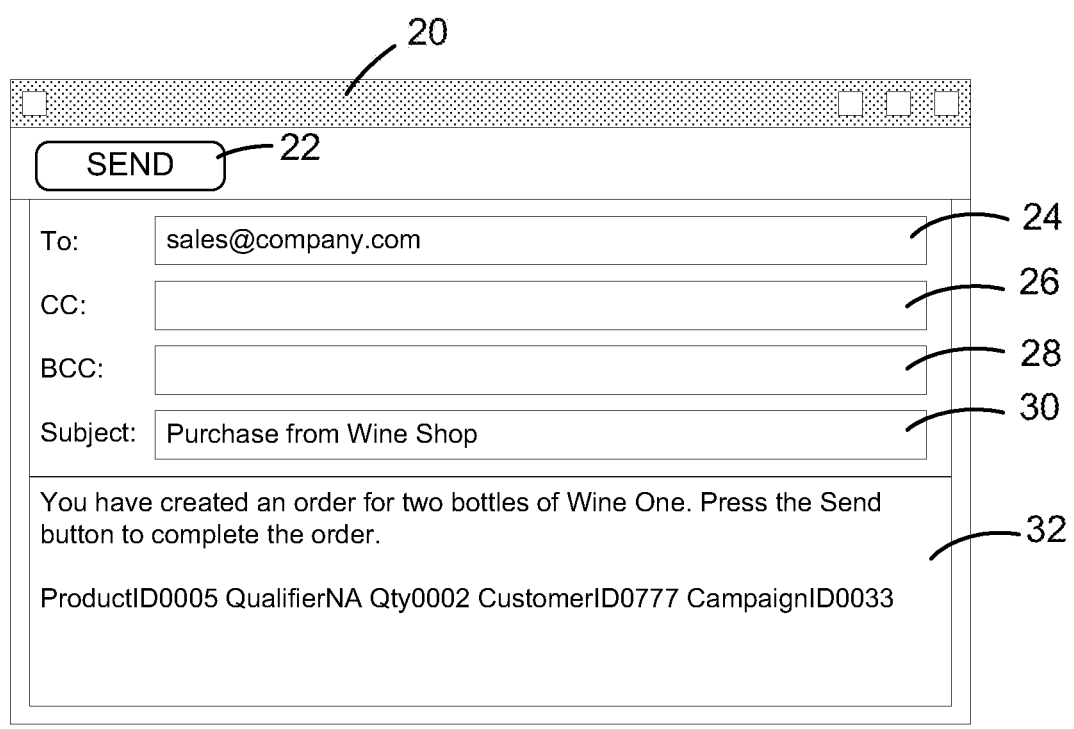
FIG. 1b illustrates an email message for placing an order.

FIG. 1*b* illustrates an email message for placing an order. FIG. 1*b* shows an example message composition window 20 that may be displayed in response to a selection of a link from the message body area 16 of the email display window 10 of FIG. 1*a*. The message composition window 20 of FIG. 1*b* may include a Send button 22, a To area 24, a CC area 26, a BCC area 28, a Subject area 30, and a message body area 32. The Send button 22 in the message composition window 20 of FIG. 1*b* may be responsive to input from a user such as a mouse click, keyboard input, or any other type of input. The different areas 24, 26, 28, 30, 32 in the message composition window 20 display different portions of an email message. For example, the To area 24 includes text that indicates email addresses to which the email message is addressed, while the message body area 32 displays the contents of the body of the email message. Each or any of these different areas 24, 26, 28, 30, 32 may be editable based on user input. Changes to the contents of these areas 24, 26, 28, 30, 32 may change the corresponding portion of the email message.

FIG. 1*b* shows an example wherein the "2 Bottles" link beneath the picture of the Wine One and described above with reference to FIG. 1*a* is selected. The To area 24 indicates that the message is addressed to sales@company.com. The Subject area 30 indicates that the subject of the message is "Purchase from Wine Shop." The CC area 26 and BCC area 28 are blank. Continuing the example of FIG. 1*b*, Wine One product has a product identifier of "0005" and John Smith has a customer identifier of "0777." Accordingly, the message body area 32 includes the text "ProductID0005" and "CustomerID0777." To indicate that the user has selected the purchase of two bottles, the message body area 32 includes the text "Qty0002." Further, the message body area 32 includes the text "CampaignID0033," indicating that the order is associated with an email campaign with an identifier of "0033."

In an instance where a different link from the message body area 16 of FIG. 1*a* is selected, the display areas 24, 26, 28, 30, 32 in the message composition window 20 may include contents specified by the selected different link. For example, in an instance where a link related to Wine Two is selected, the message body area may not include the text "ProductID0005," but may include text that indicates the corresponding identifier for Wine Two.

Figure 1C:
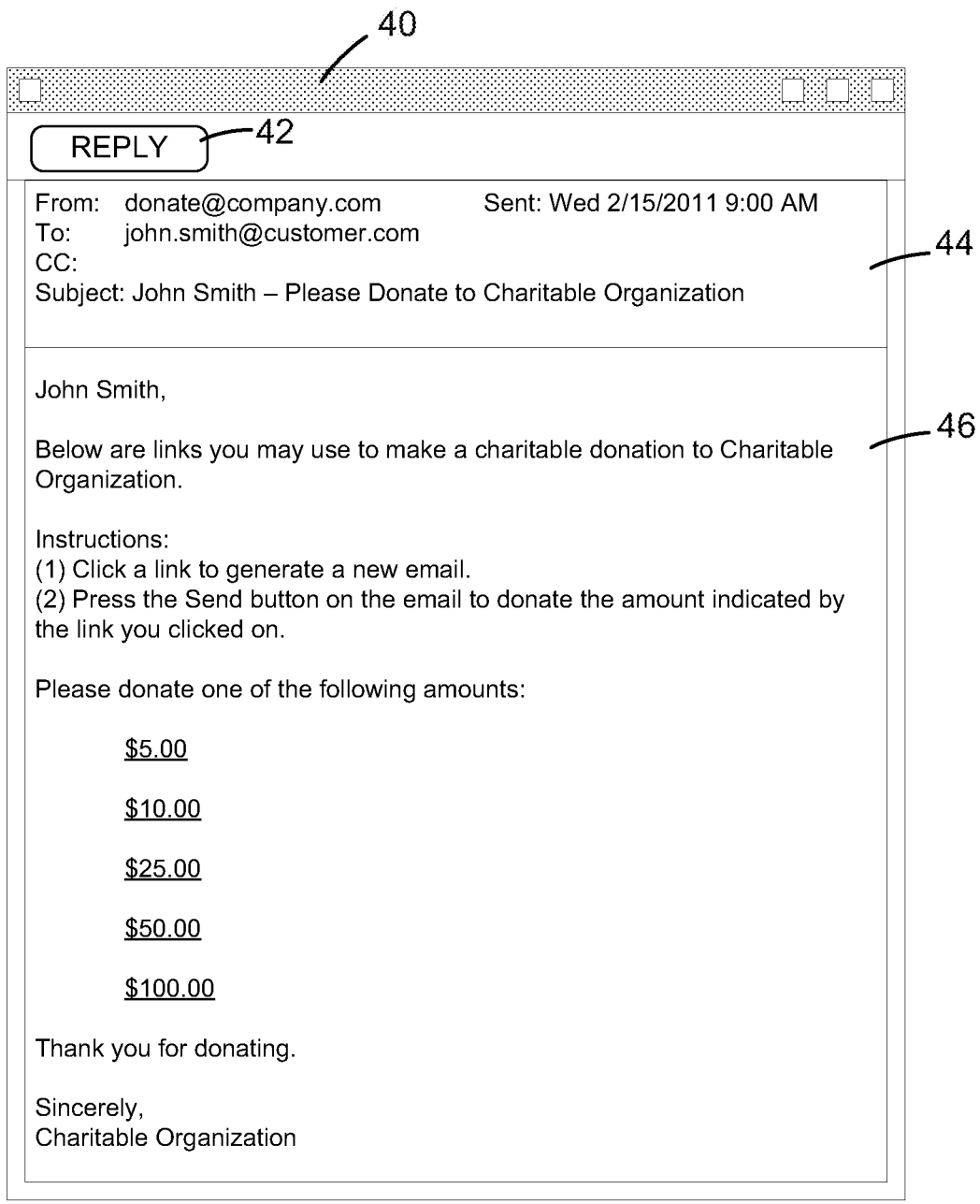
FIG. 1c illustrates an advertisement email message that solicits a donation.

FIG. 1*c* illustrates an advertisement email message that solicits a donation. FIG. 1*c* shows an email display window 40 that may be used by the email client module of customer device 140 to display a second example email message from the message processing module. The email display window 40 includes a Reply button 42, a control area 44, and a message body area 46. These display areas 42, 44, 46 may possess similar and/or analogous characteristics and/or perform similar functionality as corresponding display areas 12, 14, 16 in the message composition window 20 of FIG. 1*a*. According to the example of FIG. 1*c*, the control area 44 shows that the sender of the message has the email address "donate@company.com." This is an email address that may be associated with an account used by the e-commerce system 120 for the communication of email messages. Further to this example, the control area 44 shows that the email address of the example recipient of the message (John Smith) is "john.smith@customer.com."

As shown in FIG. 1*c*, the message body area 46 of the email display window 40 may display an example email message that shows information related the solicitation of donations for an example non-profit organization ("Charitable Organization"). The message body area 46 also includes mailto links, such as the "$5.00," "$10.00," "$25.00," "$50.00," and "$100.00" links. These links may possess similar and/or analogous characteristics, and/or include similar and/or analogous information, as the mailto links described above with reference to FIG. 1*a*. The "$5.00" link describes an email message that, if received by the e-commerce system 120, will indicate to the e-commerce system 120 that John Smith may like to donate $5.00 to Charitable Organization. Similarly, the "$10.00," "$25.00," "$50.00, and $100.00" links describe email messages with corresponding information for $10.00, $25.00, $50.00, and $100.00 donations, respectively.

The email client module of customer device 140 may receive a user input that indicates that one of the links displayed in the message body area 46 is selected. The email client module of customer device 140 may, in response to this user input, generate and display an order email message as specified by the selected link.

Figure 1D:
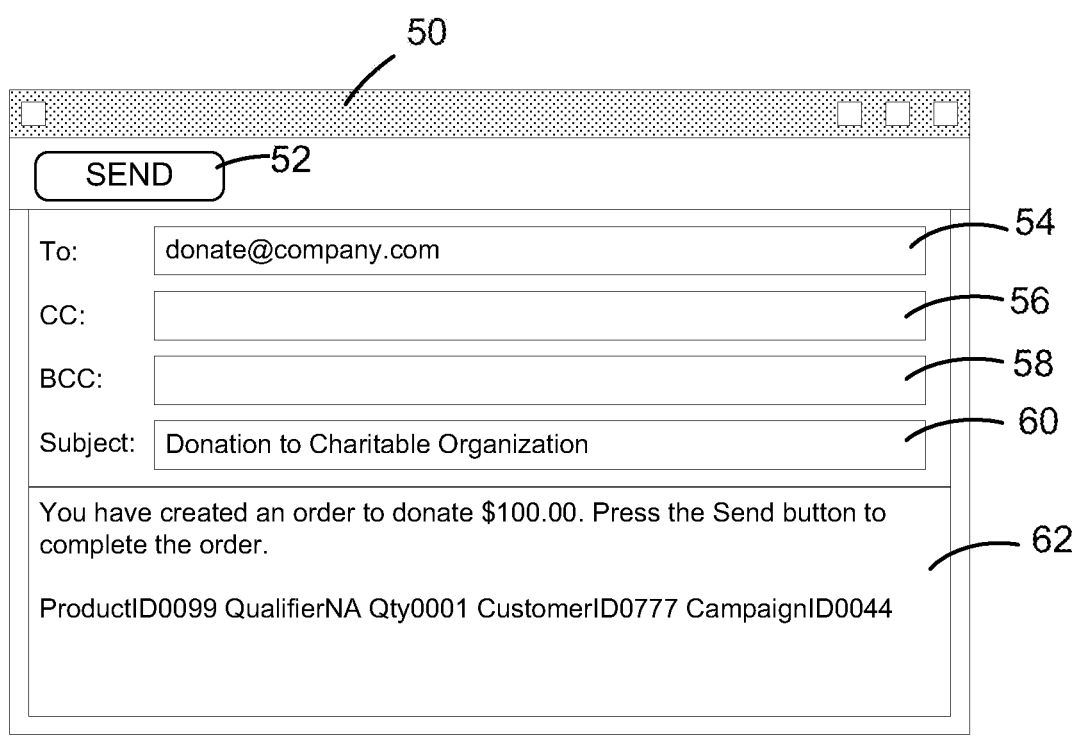
FIG. 1d illustrates an email message for initiating a donation.

FIG. 1*d* illustrates an email message for confirming a donation. FIG. 1*d* shows an example message composition window 50 that may be displayed in response to a selection of a link from the message body area 46 of the email display window 40 of FIG. 1*b*. The message composition window 50 of FIG. 1*d* may include a Send button 52, a To area 54, a CC area 56, a BCC area 58, a Subject area 60, and a message body area 62. These display elements 52, 54, 56, 58, 60, 62 may possess similar and/or analogous characteristics and/or perform similar functionality as corresponding display areas 22, 24, 26, 28, 30, 32 in the message composition window 20 of FIG. 1b.

FIG. 1d shows an example wherein the "$100.00" link from the message body area 46 of the email display window 40 of FIG. 1c is selected. The To area 54 indicates that the message is addressed to donate@company.com. The Subject area 60 indicates that the subject of the message is "Donation to Charitable Organization." The CC area 56 and BCC area 58 are blank. According to this example, a donation of $100.00 to Charitable Organization has a product identifier of "0099," and John Smith has a customer identifier of "0777." Accordingly, the message body area 62 includes the text "ProductID0099" and "CustomerID0777." Further, the message body area 62 includes the text "CampaignID0044," indicating that the order is associated with an email campaign with an identifier of "0044."

The email client module of customer device 140 may send the generated order email message to the e-commerce system 120. This may be performed in response to input from a user of the customer device 140. As one example, the email client module of customer device 140 may, in response to a selection of the Send button 52 in the message composition window 50 of FIG. 1d, transmit an order email message based on the contents of the fields 54, 56, 58, 60, 62 in the message composition window 50. As another example, the email client module of customer device 140 may, in response to a selection of the Send button 52 in the message composition window 50 of FIG. 1d, transmit an order email message based on the contents of the display areas 54, 56, 58, 60, 62 in the message composition window 50.

Figure 2:
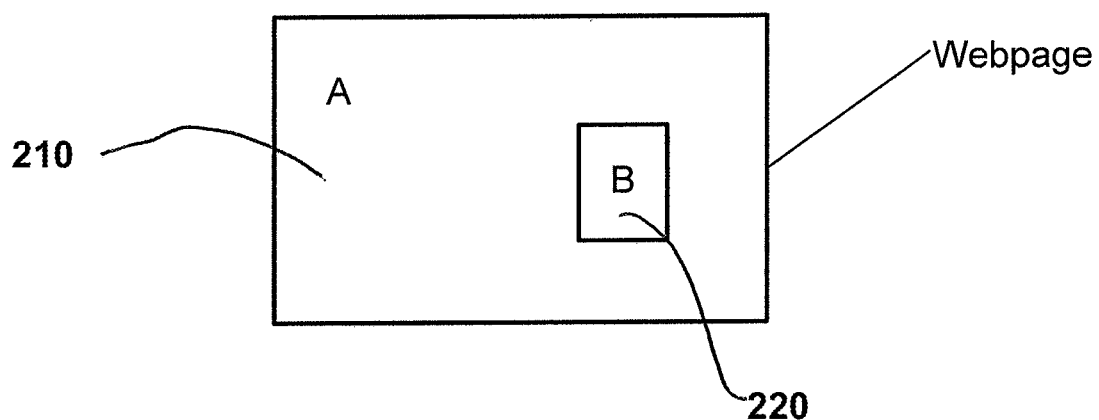
FIG. 2 illustrates the two frames of a page within the system of FIG. 1.

FIG. 2 illustrates the two frames of a page 200 within system 100. As illustrated in FIG. 2, there is a merchant, or vendor, page 210 (labeled "A") and an iframe 220 (labeled "B") embedded thereon. The content of iframe 220 may be changed without requiring the user to reload the surrounding page. This capacity is enabled through JavaScript or the target attribute of an HTML anchor. Web designers, developers, programmers or engineers use iframes to embed interactive applications in Web pages, including those that employ Ajax (Asynchronous JavaScript and XML), like Google Maps or e-commerce applications. The use of the iframe 220 enables the vendor system 130 to put this system in place with greater simplicity, while still maintaining the high level of security provided in the original embodiment. Messages may be transmitted securely between the two frames 210, 220 of a page 200 and validating the URLs of the pages the message is being transferred between. The e-commerce system 120 may provide the source page of an HTML document embedded within another HTML document for iframe 220. This allows content from a third party to be contained within the web page 210, and this content on page 210 may be changed without requiring the web page 200 to be reloaded. The e-commerce system 120 may leverage this environment to generate a secure financial transaction. This may include the vendor identifier (partner id), and details regarding the transaction (amount, etc.) within iframe 220.

Figure 3:
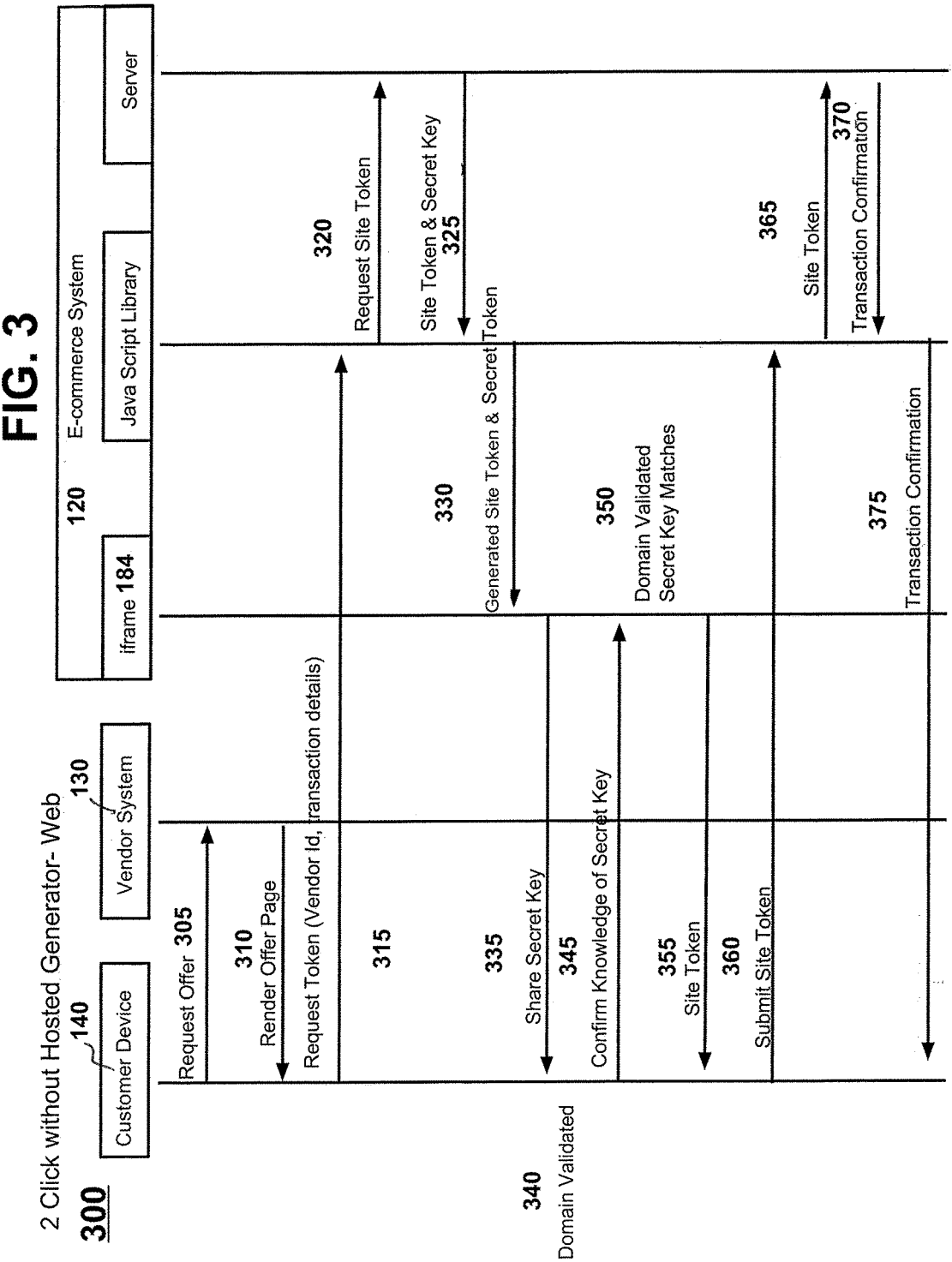
FIG. 3 illustrates a method of a minimum-of-clicks checkout method without a hosted generator via the web.

When this frame 220 is loaded, e-commerce system 120 looks up the authorized domains associated with the vendor record and generates a one-time secret value as will be further discussed with respect to FIG. 3. This value is passed to the vendor page 210 via secure cross-origin communication, which may fail if the vendor page 210 does not match the authorized domain on the vendor record, and the vendor page 210 passes that secret value back to the iframe 220 via a secure form of cross-origin communication. One method of securing cross-origin communication is post-Message. Post-Message allows different pages 210, 220 to access one another. If the secret value has not changed, the transaction may be executed. This provides security, and eases client implementation by not requiring the token generator be installed on the vendor server 130.

For example, method 300 shown in FIG. 3 illustrates a minimum-of-clicks checkout method without a hosted generator via the web. Method 300 includes a customer device 140, a vendor system 130, and e-commerce system 120 incorporating the iframe generator 184, a java script library, and a server.

In method 300, the customer device 140 via a browser requests an offer from the vendor system 130 at step 305. The vendor system 130 transmits an offer to the customer device 140 web browser at step 310. The customer device 140 requests a token, including a vendor ID and transactions details, from the e-commerce system 120 at step 315. The e-commerce system 120 creates a site token and secret key at steps 320 and 325. The e-commerce system 120 then sends the generated site token and secret token to the iframe generator 184 at step 330. The e-commerce system 120 shares the secret key with the customer device 140 at step 335. Customer device 140 validates the domain at step 340 and confirms to the e-commerce system 120 via iframe generator 184 knowledge of the secret key at step 345. The e-commerce system 120 validates secret key matches at step 350. The e-commerce system 120 via iframe generator 184 sends a site token to the customer device 140 at step 355. The customer device 140 then submits the site token to the e-commerce system 120 at step 360. The site token is internally processed within the e-commerce system 120 at step 365 and a transaction confirmation is produced at step 370. This transaction confirmation is transmitted from e-commerce system 120 to the customer device 140 at step 375 to complete the transaction.

Figure 4:
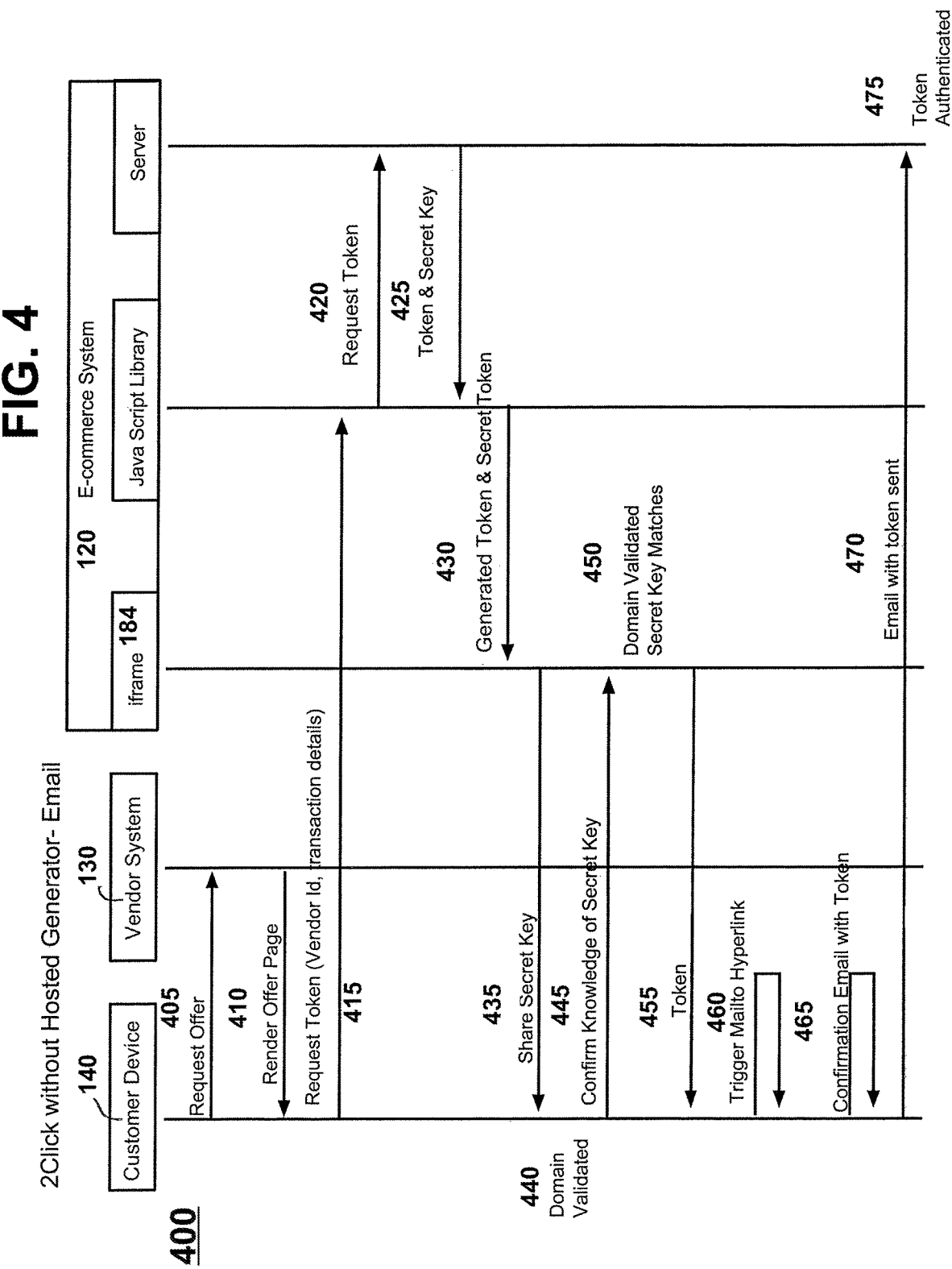
FIG. 4 illustrates a method of a minimum-of-clicks checkout method without a hosted generator via email.

This process is not exclusive to URL-based checkout, but may also be utilized for an email-based checkout system. For example, method 400 shown in FIG. 4 illustrates a minimum-of-clicks checkout method without a hosted generator via email. Method 400 includes a customer device 140, a vendor system 130, and e-commerce system 120 incorporating the iframe generator 184, a java script library, and a server.

In method 400, the customer device 140 via a browser requests an offer from vendor system 130 at step 405. The vendor system 130 transmits an offer to the customer device 140 web browser at step 410. The customer device 140 requests a token, including a vendor ID and transactions details, from the e-commerce system 120 at step 415. The e-commerce system 120 creates a token and secret key at steps 420 and 425. The e-commerce system 120 then sends the generated token and secret token to the iframe generator 184 at step 430. The e-commerce system 120 shares the secret key with the customer device 140 at step 435. Customer device 140 validates the domain at step 440 and confirms to the e-commerce system 120 via iframe generator 184 knowledge of the secret key at step 445. The e-commerce system 120 validates secret key matches at step 450. The e-commerce system 120 via iframe generator 184 sends a token to the customer device 140 at step 455. The customer device 140 then triggers the mailto link at step 460 and generates a confirmation email with the token at step 465. When the customer requests to make a payment at the checkout they are presented with a button that is a mailto link instead of an HTTP link described in FIG. 3. When the customer selects this mailto link, a response email addressed to the e-commerce system 120 is automatically generated including identifiers and the token. The customer device 140 then sends the email with the token to the e-commerce system 120 at step 470. The e-commerce system 120 receives the email and authenticates the token at step 475 to complete the transaction.

Figure 5:
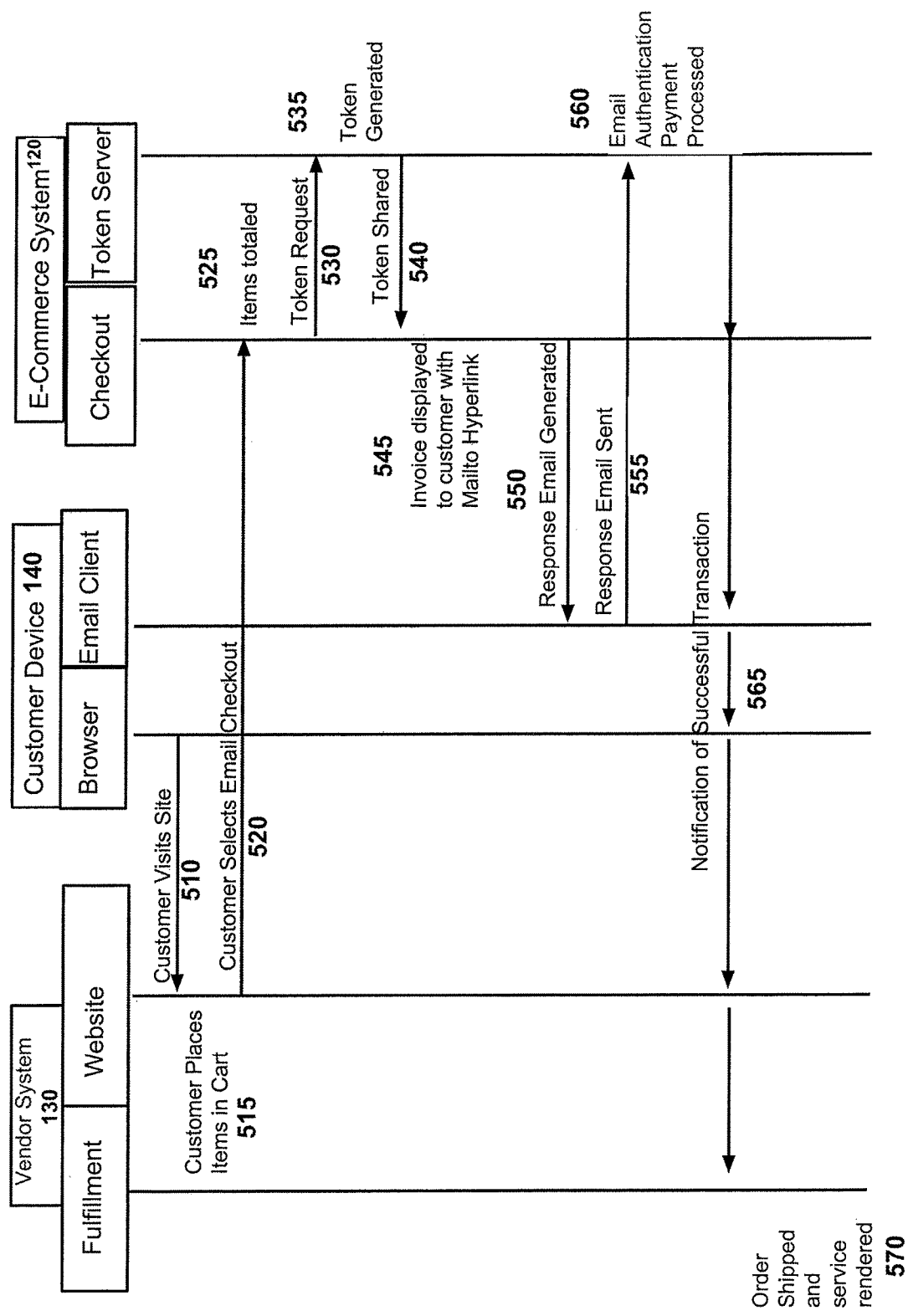
FIG. 5 illustrates a flow diagram of a method of an email-based website checkout.

FIG. 5 illustrates a flow diagram of a method 500 of an email-based website checkout. Method 500 includes a customer using a browser on a customer device 140 to visit a vendor system 130 website at step 510. At step 515, the customer using customer device 140 places one or more items into a shopping cart. The customer using customer device 140 initiates an email checkout via the website of vendor system 130 at step 520, which then initiates the e-commerce system 120 to total the items at checkout at step 525. Method 500 describes a system where email-based website checkout is the only option for checkout. In another example, the customer may have the option to select a payment method directly on the browsing page, without needing to go to a separate shopping cart page or the website may use a pop-up function for the checkout display.

The e-commerce system 120 then requests a token for the checkout at step 530. The token generator of e-commerce system 120 generates a token at step 535. This generated token is then provided or shared within the checkout of e-commerce system 120 at step 540. An invoice may then be displayed to the customer via customer device 140 with a mailto link at step 545. A response email may be generated by the e-commerce system 120 and sent to the email client of customer device 140 at step 550. A response email may be sent by the customer device 140 via its email client to the e-commerce system 120 at step 555. When the customer selects the mailto link at step 545, the email client on the customer device 140 may generate a response email which includes the token at step 550. This email may be addressed to the e-commerce system 120. The response email may be sent at step 555 to the e-commerce system 120 to complete the transaction from the customer perspective.

The e-commerce system 120 may perform a validation check of the email payment at step 560. When the e-commerce system 120 receives the email, the e-commerce system 120 validates the identity of the sender by employing a variety of email authentication techniques including, but not limited to, SPF and DKIM. The e-commerce system 120 may then decode the token and process the payment. The payment may also be processed by the vendor system 130.

The e-commerce system 120 may optionally complete the transaction by sending a notification that the transaction was successful to the vendor system 130 at step 565. Method 500 may be completed by the vendor system 130 fulfilling the order and shipping a product or completing the service at step 570. In this example, the token generator is located at the e-commerce system 120. However, in an alternative embodiment, the token generator and decoding functions may be located in the vendor system 130 or with a third party. In another embodiment, the customer may need to insert their email address in the response email when they are in the shopping cart, or alternatively, the system may recognize the customer because of being logged on, or otherwise identified, already.

Method 500 may be used in connection with websites which include a shopping cart or web checkout feature. Customers may register with the e-commerce system 120 by interacting with the account management module 122 via the web browser on customer device 140. A user of the customer device 140 may provide information to the account management module 122 via the web browser module such as: an email address associated with the customer; financial information associated with the customer, such as credit card information (such as a credit card number and expiration date) and/or other financial information related to bank accounts and/or other types financial accounts (such as e-payment accounts, virtual money, alternative currencies or direct clearinghouse) that may be used to make payments to the vendor system 130 via the e-commerce system 120; shipping address information; billing address information; delivery address information; preferences on products, sizes, other customer's, biographical information, payment schedules and preferred nonprofits that the customer may want to be applied to a profile or advertising campaigns. The registration may, additionally or alternatively, be configured in accordance with the vendor and not directly with the e-commerce system 120.

Figure 6:
FIG. 6 illustrates an example vendor web page that may be used in connection with a web checkout as described in FIG. 5.

FIG. 6 illustrates an example vendor web page 600 that may be used in connection with a web checkout as described in FIG. 5. As shown in FIG. 6, the customer may select one or more products to add to their cart using input fields 610. A customer using a customer device 140 may adjust the size and quantity of products ordered in product fields using a pop-up (not depicted). To use an email-based web checkout, as described herein, the customer selects input field 620.

Figure 7:
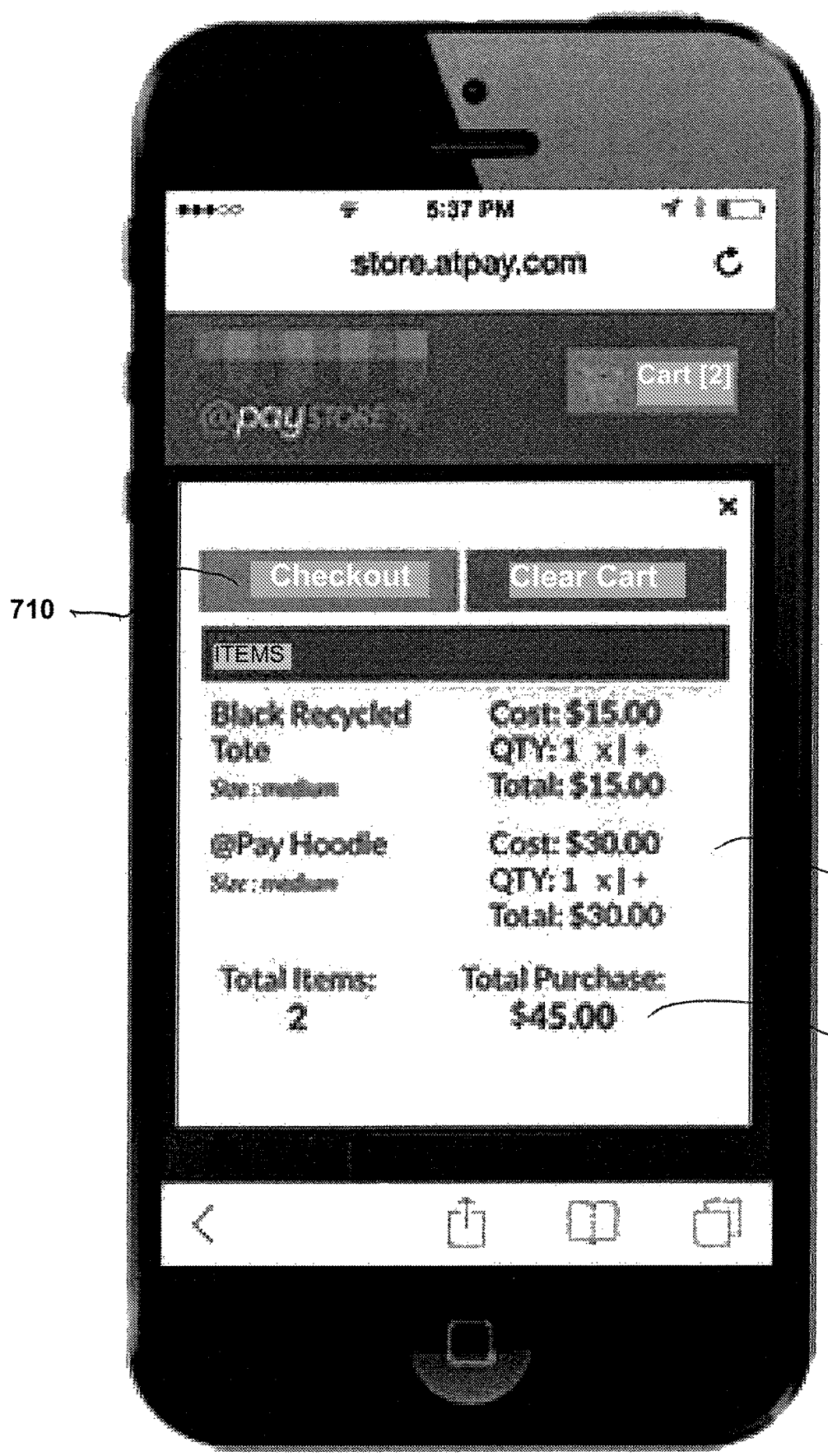
FIG. 7 illustrates an example e-commerce email-based website checkout page used in connection with the vendor's website shown in FIG. 6.

FIG. 7 illustrates an example e-commerce email-based website checkout page 700 used in connection with the vendor's website shown in FIG. 6. As shown in FIG. 7, the e-commerce system 120 totals the amount of purchases 705 in the cart and presents the customer device 140 with a mailto link 710. The mailto link 710 is associated with the token. A customer using the customer device 140 may select the mailto link 710 to generate a response email with the token that when delivered completes the transaction.

Figure 8:
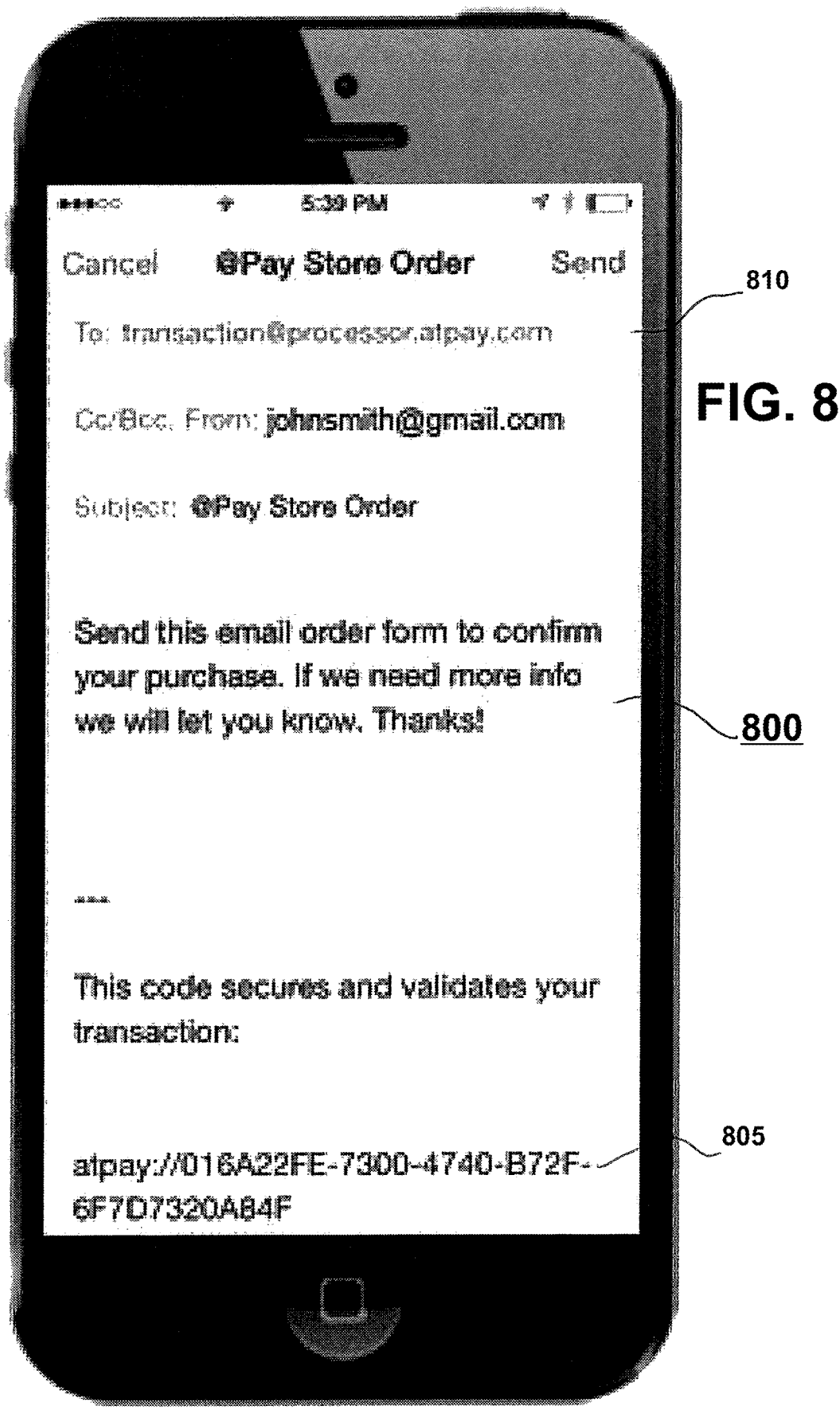
FIG. 8 illustrates an example response email message associated with the web checkout as described in FIG. 7.

FIG. 8 illustrates an example response email message 800 associated with the web checkout as described in FIG. 7. Once a customer has selected the mailto link on the email-based website checkout web page to open the email client and generate the response email 800. The response email 800 may include the token 805 and be addressed 810 to the e-commerce system 120. The token 805 is located in the body field, however, this is as an example only, and the token 805 may be located in other fields of the response email 800. For the customer, the target address of the response email 800 may appear to be directed to the vendor system 130, however, it may be directed to the e-commerce system 120. The location of the e-commerce system 120 may be contained in a third party system such as an email service provider, email client or hosting entity. The e-commerce system 120 may receive the response email 800 and perform a validation check to authenticate the sender of the email among other forms of authentication. Based on the result of the validation check, the e-commerce system 120 may continue processing the email.

Figure 9:
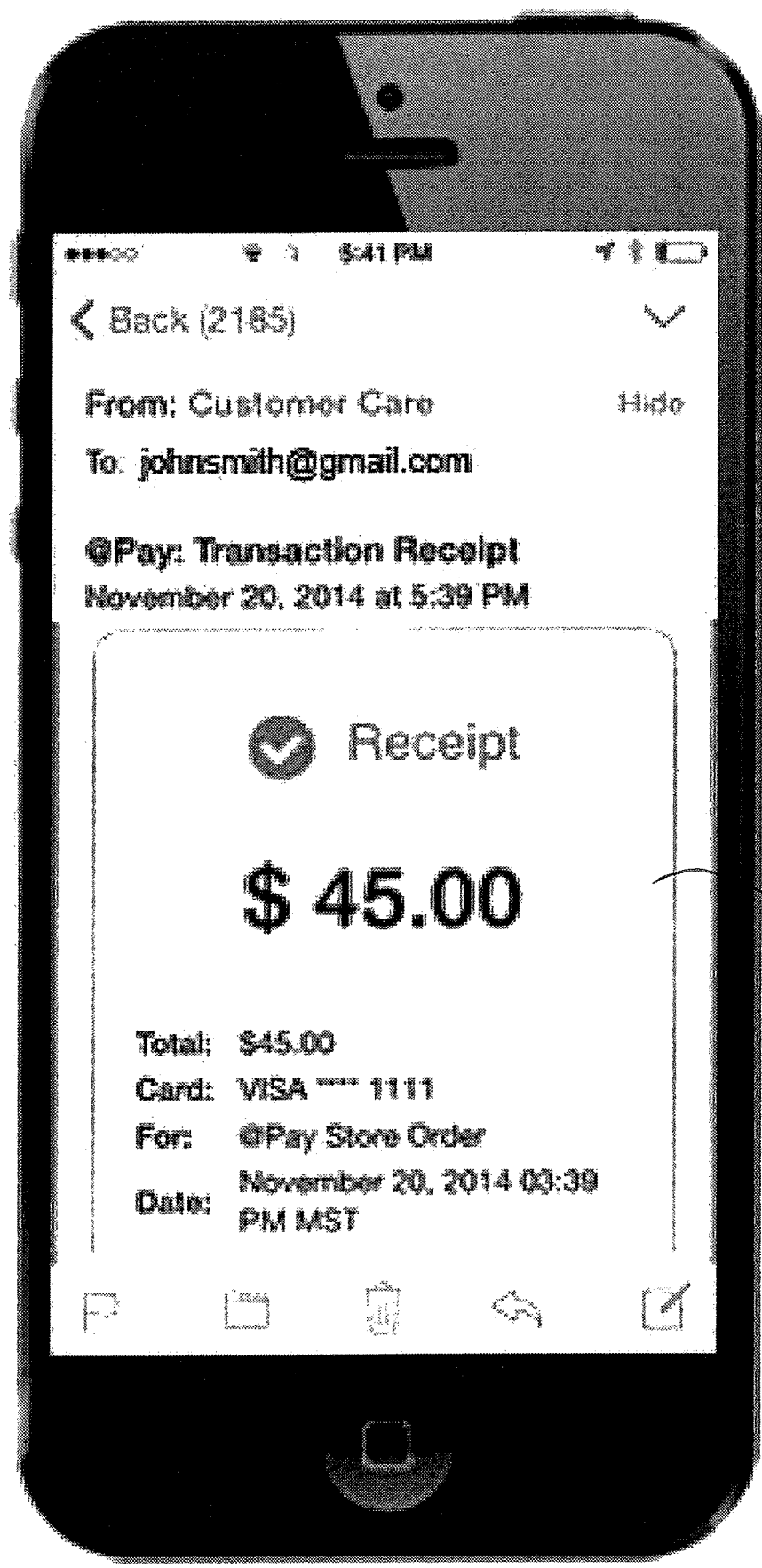
FIG. 9 illustrates an example confirmation email message or email message with receipt associated with the email-based website checkout as described in FIGS. 5-8.

FIG. 9 illustrates an example (and optional) confirmation email message or email message with confirmation email message 900 associated with the email-based website checkout as described in FIGS. 5-8. Once a customer device 140 has transmitted a response email, the customer device 140 may receive an email receipt 900 as shown in FIG. 9. Confirmation email message 900 may include an email body which may include information regarding the order. In another example, confirmation email message may include one or more cancel buttons, allowing a customer using a customer device 140 to cancel part or all of the order. The cancel buttons may be associated with mail to links.

In another embodiment, a customer shopping on an e-commerce website may be presented with two options to continue their order including adding the item to their cart, or purchasing the item immediately with the e-commerce system 120 Direct-to-Purchase without Shopping Cart option, also referred to as direct-to-purchase.

Adding items to the shopping cart follows the existing checkout process which may be used by vendors. The customer using a customer device 140 may confirm order details, enter payment information and submit the order. The direct-to-purchase option eliminates the cumbersome step of storing items in the shopping cart and then needing to complete the transaction at a later time, instead completing the purchase immediately upon selection of the product. This direct-to-purchase scenario assumes that the customer is registered with the e-commerce system 120 when visiting the vendor's site and/or it assumes all transaction are completed via email-based transactions as described herein above. The secure environment of the email client substituting for the logged-in status of a website.

Figure 10:
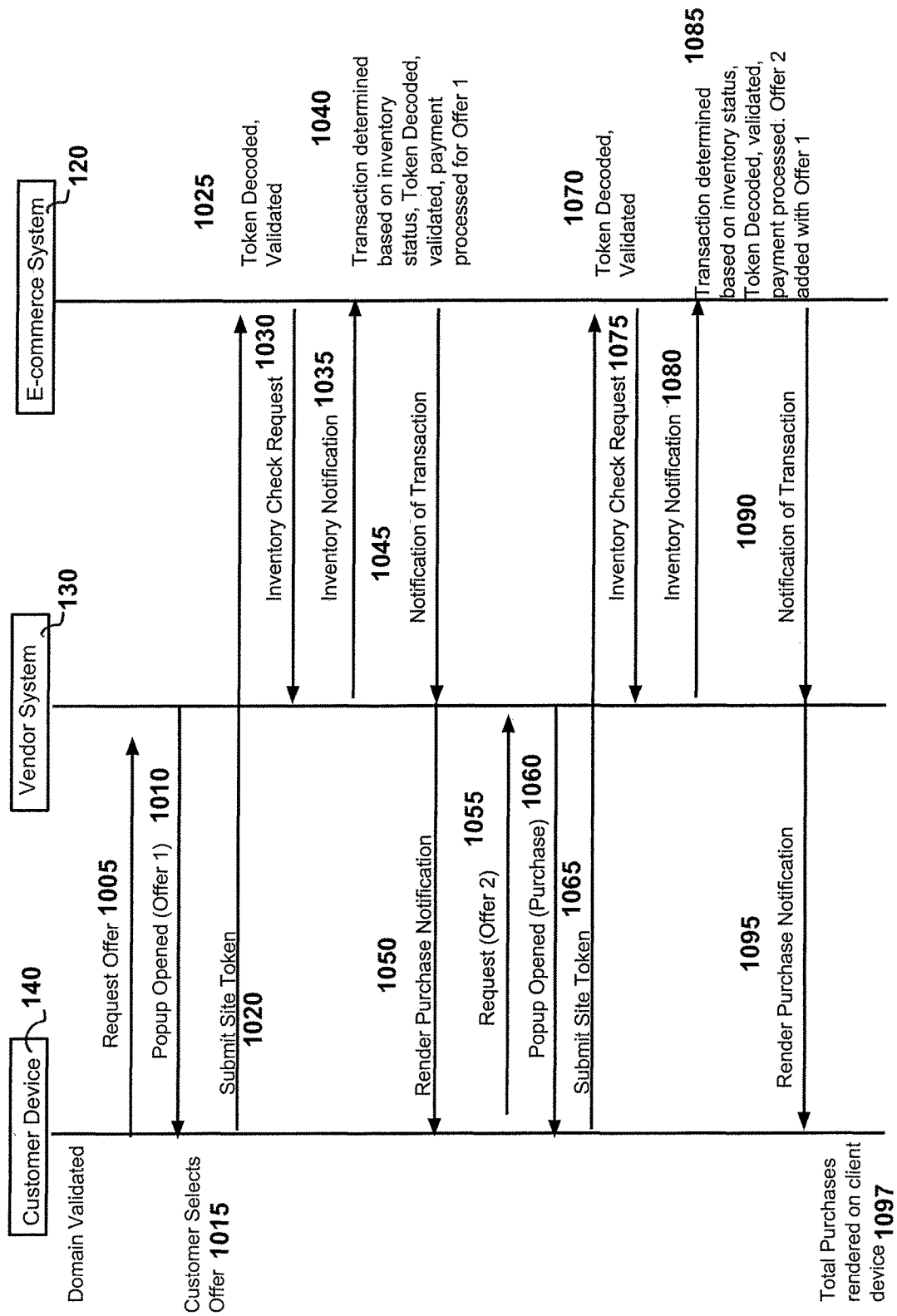
FIG. 10 illustrates a method of a direct purchase without the use of a shopping cart.

FIG. 10 illustrates a method 1000 of a direct purchase without the use of a shopping cart. In this scenario, the interactions may occur between a customer device 140, a vendor system 130, and the e-commerce system 120. A customer may request an offer using customer device 140 from the vendor system 130, for example, at step 1005. The vendor system 130 may respond with at least one offer (Offer 1) at step 1010. The customer via customer device 140 accessing a vendor system 130 web page may select one or more offers for items they wish to purchase at step 1015. A site token is submitted, such as from the customer device 140 to the e-commerce system 120 at step 1020, which submits for payment to the e-commerce system 120 at step 1025. Alternatively, this request may be made by an email-based website request described above.

Optionally, the e-commerce system 120 having received the request from the customer device 140 notifies and checks inventory with the vendor system 130 at step 1030. These checks with the inventory may be required and may also be used to cancel orders. This step 1030 may be used to cancel orders. The vendor system 130 notifies the e-commerce system 120 that the inventory is available and the transaction may be processed at step 1035. The e-commerce system 120 authenticates the token and processes the payment at step 1040. The vendor system 130 is notified of the completed transaction at step 1045 and the notification is rendered on the customer device 140 at step 1050.

As shown in FIG. 10, these steps 1005-1050 described above may be repeated for additional offers shown as steps 1055-1097. An example of additional or add-on offers are represented in Offer 2 in FIG. 10. As more offers are purchased a list of purchases are rendered to the customer. In this example they appear in a pop-up window at step 1060 but they may appear as integrated in the browser window or may be sent via an email message update of total purchases.

A customer may request a subsequent offer using customer device 140 from the vendor system 130, for example, at step 1055. The vendor system 130 may respond with at least one offer (Offer 2) at step 1060. The customer via customer device 140 accessing a vendor system 130 web page may select one or more offers for items they wish to purchase. A site token is submitted, such as from the customer device 140 to the e-commerce system 120 at step 1065, which submits for payment to the e-commerce system 120 at step 1070. Alternatively, this request may be made by an email-based website request described above. The e-commerce system 120, having received the request from the customer device 140, notifies and checks inventory with the vendor system 130 at step 1075. These checks of the inventory may be required and may also be used to cancel orders. This step 1075 may be used to cancel orders. The vendor system 130 notifies the e-commerce system 120 that the inventory is available and the transaction may be processed at step 1080. The e-commerce system 120 authenticates the token and processes the payment at step 1085. The vendor system 130 is notified of the completed transaction at step 1090 and the notification is rendered on the customer device 140 at step 1095. A total of the purchases rendered on the customer device 140 may be presented at step 1097.

Figure 11:
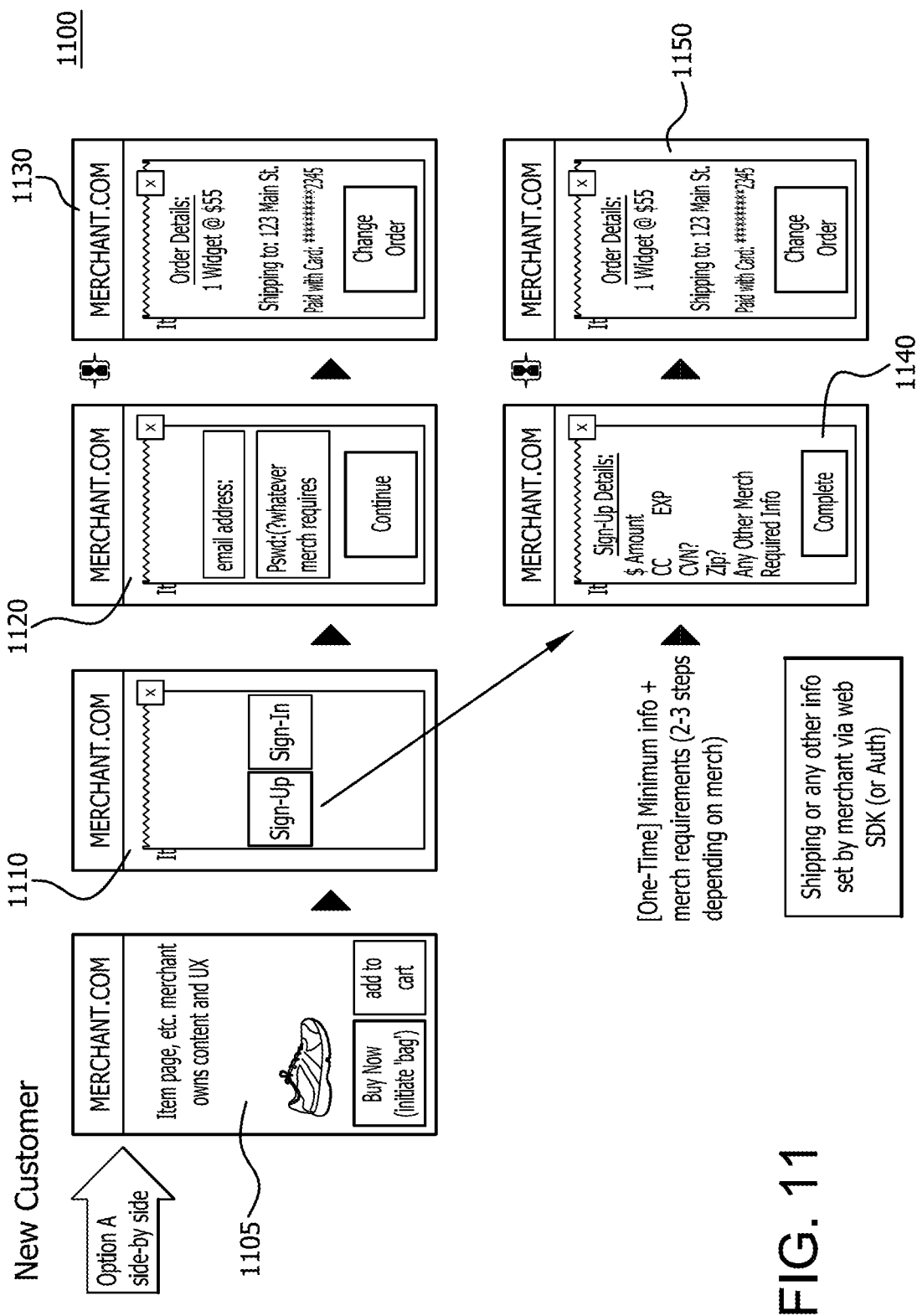
FIG. 11 illustrates a method for a new customer or returning customer to make a direct purchase.

Referring now to FIG. 11 there is shown a method 1100 for a new customer or returning customer to make a direct purchase. This method 1100 includes a vendor system 130 page that provides a depiction of a product shown in screen depiction 1105. By using the customer's e-commerce system 120 user account for payment processing, the vendor system 130 may offload customer authentication and payment detail capture/storage to the e-commerce system 120.

If the customer has registered with the e-commerce system 120 but is not logged in to the e-commerce system 120 on the vendor system's 130 site, the customer may be able to provide a login via the sign-in portion of screen depiction 1110. For example, when the customer clicks on the direct-to-purchase option, they may be presented with a pop-up screen that may allow them to either sign up or sign in to the vendor system's 130 site, such as on screen depiction 1110. The customer may choose "Sign In" and enter the account email address and associated password as shown in screen depiction 1120. When login is completed, the transaction request is submitted to the e-commerce system 120 for processing as shown in screen depiction 1130. The described actions may suffice for the payment to be processed and the order to be completed.

In an alternative implementation, the logged-in customer may be presented with a pop-up box in which they confirm the purchase before the payment is processed. This confirmation maybe an HTTP or other type of link that completes the transaction, or may be a mailto link that generates a response email that the customer sends to the e-commerce system 120 to complete the transaction as described above.

Once the order has been submitted, the customer device 140 may display a summary of their order details, which may include, but is not limited to, the item information, total amount paid, payment method, shipping information, etc., shown in screen depiction 1130. An option to change or cancel the order may be presented to the customer, being clear that the order has already been processed and that they are not making modifications to an order prior to its submission.

If the customer has registered with the e-commerce system 120 and is logged into the vendor system's 130 site, when the logged-in customer clicks on the direct-to-purchase option for a particular item, the transaction may be processed. The described actions may suffice for the payment to be processed and the order to be completed.

In an alternative implementation, the logged-in customer may be presented with a pop-up box in which they confirm the purchase before the payment is processed. This confirmation maybe an HTTP or other type of link or may be a mailto link that generates a response email that the customer sends to the e-commerce system 120 to complete the transaction as described above.

Once the order has been submitted, the customer device 140 may display a summary of their order details, which may include but is not limited to the item information, total amount paid, payment method, shipping information, etc., as shown in screen depiction 1130. An option to change or cancel the order may be presented to the customer, being clear that the order has already been processed and that they are not making modifications to an order prior to its submission.

If the customer is not registered with the e-commerce system 120, when the customer clicks on the direct-to-purchase option they may be presented with a pop-up that may allow them to either Sign Up or Sign in to their account with the e-commerce system 120 at screen depiction 1110. This customer may choose "Sign Up" and enter the required information to complete a registration with the e-commerce system 120 at screen depiction 1140. When this is completed, the transaction request is submitted to the e-commerce system 120 servers for processing as shown in screen depiction 1150. The described actions may suffice for the payment to be processed and the order to be completed.

In an alternative implementation, the logged in customer may be presented with a pop-up box in which they confirm the purchase before the payment is processed. This confirmation maybe an HTTP or other type of link or may be a mailto link that generates a response email that the customer sends to the e-commerce system 120 to complete the transaction as described above.

Once the order has been submitted, the customer device 140 may display a summary of their order details, which may include but is not limited to the item information, total amount paid, payment method, shipping information, etc., shown in screen depiction 1150. An option to change or cancel the order may be presented to the customer, being clear that the order has already been processed and that they are not making modifications to an order prior to its submission.

Figure 12:
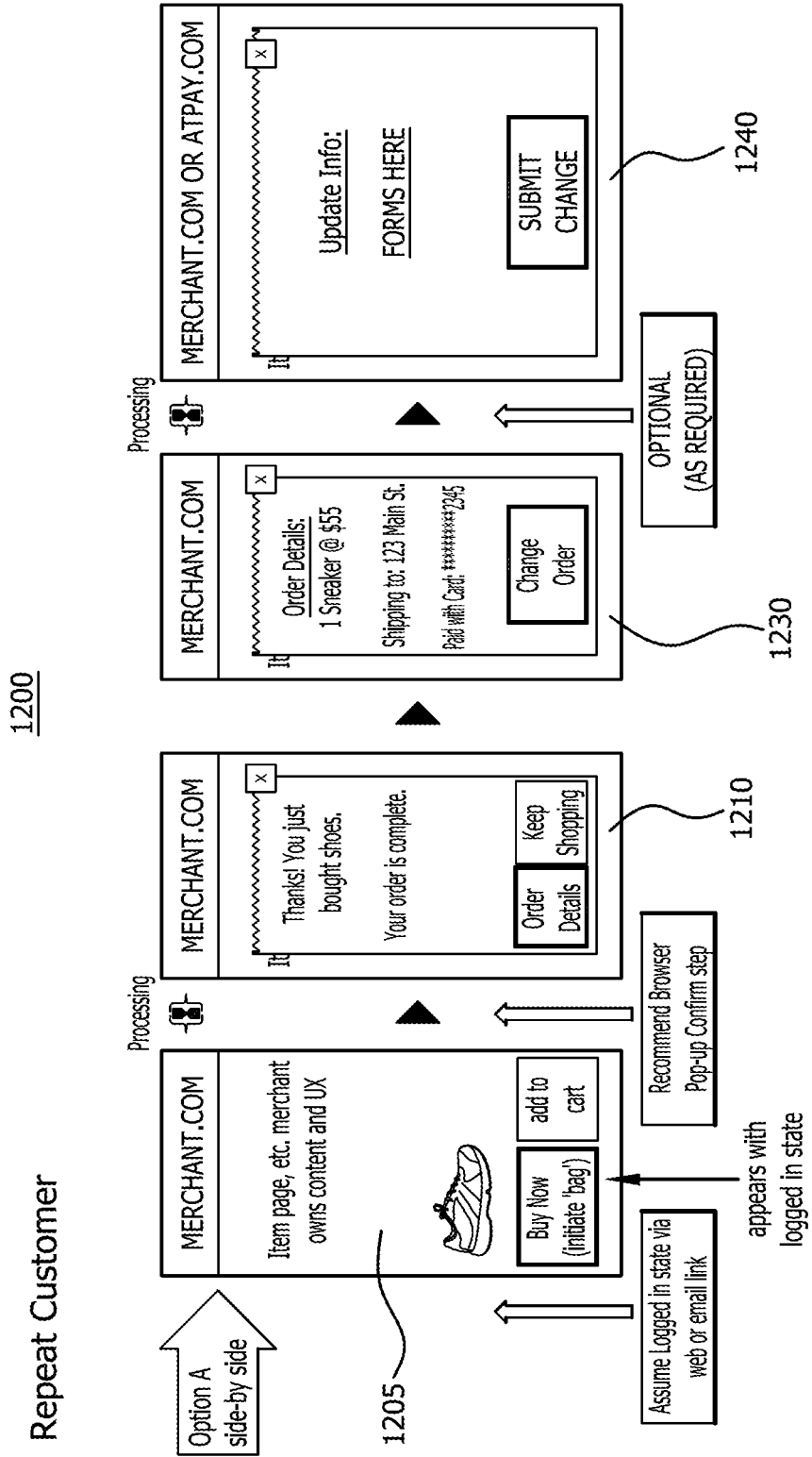
FIG. 12 illustrates a method that may be used for making a direct purchase when the vendor's site does have a log in or account mechanism.

Referring now to FIG. 12, there is shown a method 1200 that may be used when the vendor system's 130 site does have a log in or account mechanism. The vendors 130 may implement the e-commerce system's 120 JavaScript SDK on their web checkout forms to capture and submit the required payment information to the e-commerce system 120. This method 1200 may be used by a customer that is registered with the e-commerce system 120 but is not logged into the vendor system's 130 site. When the customer clicks on the direct-to-purchase option of screen depiction 1205, they may be presented with the vendor system 130 site's log in page. The customer may enter the appropriate credentials. When log in is completed, the transaction request is submitted to the e-commerce system 120 servers for processing. The described actions may suffice for the payment to be processed and the order to be completed as shown in screen depiction 1210.

In an alternative implementation, the logged in customer may be presented with a pop-up box in which they confirm the purchase before the payment is processed. This confirmation maybe an HTTP link or may be mailto link that generates a response email that the customer sends to the e-commerce system 120 to complete the transaction as described above.

Once the order has been submitted, the customer device 140 may display a summary of their order details in screen depiction 1230, which may include but is not limited to the item information, total amount paid, payment method, shipping information, etc. An option to change or cancel the order may be presented to the customer in screen depiction 1240, being clear that the order has already been processed and that they are not making modifications to an order prior to its submission.

If the customer is registered with the e-commerce system 120 and is logged into the vendor system's 130 site, when the logged in customer clicks on the direct-to-purchase option for a particular item of screen depiction 1205, the transaction may be processed. The described actions may suffice for the payment to be processed and the order to be completed as shown in screen depiction 1210.

In an alternative implementation, the logged in customer may be presented with a pop-up box in which they confirm the purchase before the payment is processed. This confirmation maybe an HTTP link or may be mailto link that generates a response email that the customer sends to the e-commerce system 120 to complete the transaction. This process is described above.

Once the order has been submitted, the customer device 140 may display a summary of their order details in screen depiction 1230, which may include but is not limited to the item information, total amount paid, payment method, shipping information, etc. An option to change or cancel the order may be presented to the customer in screen depiction 1240, being clear that the order has already been processed and that they are not making modifications to an order prior to its submission.

If the customer does not have an account on the vendor system's 130 site, when the customer clicks on the "Direct-to-Purchase" option they may be presented with the vendor system's 130 site sign-up page as shown in screen depiction 1205. The customer may enter the required information to complete an account and payment registration. When this is completed, the transaction request is submitted to the e-commerce system 120 servers for processing. The described actions may suffice for the payment to be processed and the order to be completed as shown in screen depiction 1210.

In an alternative implementation, the logged in customer may be presented with a pop-up box in which they confirm the purchase before the payment is processed. This confirmation maybe an HTTP or other type of link or may be a mailto link that generates a response email that the customer sends to the e-commerce system 120 to complete the transaction. This process is described above.

Once the order has been submitted, the customer 140 may display a summary of their order details in screen depiction 1230, which may include, but is not limited to, the item information, total amount paid, payment method, shipping information, etc. An option to change or cancel the order may be presented to the customer in screen depiction 1240, being clear that the order has already been processed and that they are not making modifications to an order prior to its submission.

Figure 13:
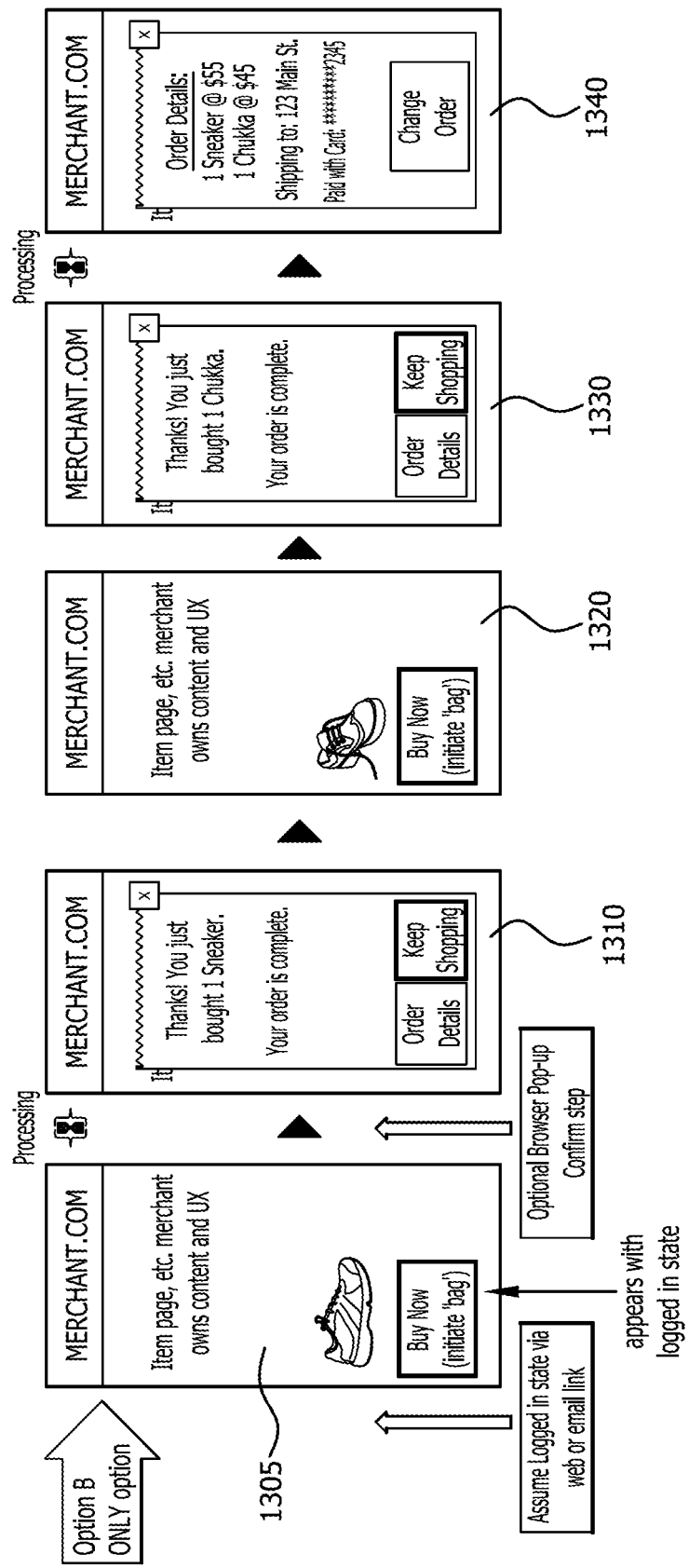
FIG. 13 illustrates a method for add-on purchases that may follow the initial transaction.

FIG. 13 illustrates a method 1300 for add-on purchases that may follow the initial transaction depicted in screen 1305. When the customer is notified that their purchase has been completed, they may be displayed an option to "Keep Shopping" shown in screen depiction 1310. If the customer finds another item they'd like shown in screen depiction 1320 and clicks on the direct-to-purchase option to complete the additional purchase shown in screen depiction 1330, they are then able to see the order details for both the original and this add-on purchase as shown in screen depiction 1340. This add-on process may be repeated any number of times. Limits may be put in place based on number of purchases, length of time between purchases, or any other characteristics chosen by either the e-commerce system 120 or the vendor system 130.

In another embodiment, the transaction(s) may be submitted for processing (charging the card) once the customer has logged-out of their e-commerce system 120 or vendor system 130 site account, instead of when they log in or select the confirmation pop-up.

The e-commerce system 120 may hold transactions without submitting the transaction to the payment gateway and then submit a single transaction after a holding period. The e-commerce system 120 may submit the transaction to a payment gateway and void the transaction, voiding herein refers to removing the transaction from the group before submission, when its authorization has not yet captured or the capture has not taken place yet. If the capture has taken place, the e-commerce system 120 may credit the customer. The e-commerce system 120 may use any combination of these elements based on known customer behavior. The e-commerce system 120 may categorize customer and vendor system 130 behavior and determine from that data the optimal moment for running charges.

For example, a customer may be segmented into three categories based on how often they decide to purchase and then log off. One group represents those people who complete shopping within one minute, the second group may include those that complete shopping after ten minutes, and the third group may include those that spent more than ten minutes shopping. The one minute group is charged based on a one minute cycle, the ten minute group is charged after ten minutes and the group that goes over ten is charged every 15 minutes. This segmentation method may also be based on how often the person needs a refund or by notifications from web beacons. The payment processing may also be managed using money which is advanced by the customer and held in an account to be spent and as the customer exceeds the account more money is charged.

It should be understood that many variations are possible based on the disclosure herein. Although features and elements are described above in particular combinations, each feature or element may be used alone without the other features and elements or in various combinations with or without other features and elements.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for improving security of an e-commerce system, the method comprising:
    sending, by the e-commerce system, a message to a browser of a customer wherein the message includes a first link;
    receiving, by the e-commerce system, a request from the browser to perform a transaction in response to the customer enabling the first link, wherein the request includes details of the transaction;
    generating, by the e-commerce system, a second link and at least one unique token in response to receiving the request, wherein the unique token comprises a value associated with the transaction;
    transmitting, by the e-commerce system, the second link and the at least one unique token to the browser;
    receiving, by the e-commerce system, a response email that is generated in response to the customer enabling the second link, wherein the response email includes a unique token; and
    performing, by the e-commerce system, an authentication of the response email;
    decoding, by the e-commerce system, the unique token to form a decoded token; and
    processing, by the e-commerce system, the transaction based on the decoded token, on a condition that the authentication is approved.

2. The method of claim 1, wherein the authentication includes at least one of Sender Policy Framework (SPF) and Domain Keys Identified Mail (DKIM) validations.

3. The method of claim 1, wherein the transaction is a payment.

4. The method of claim 1, wherein the transaction is access to a secure server.

5. The method of claim 1, further comprising calculating an amount of the transaction based on information stored in the unique token.

6. The method of claim 1, wherein the unique token is a bulk token in a direct-to-purchase scenario.

7. The method of claim 1, further comprising transmitting a confirmation message to the customer and vendor.

8. The method of claim 7, wherein the confirmation message causes the browser of the customer to display a page indicating that the transaction was performed.

9. An e-commerce system that improves security of an e-commerce transaction, the e-commerce system comprising:
    a communication interface communicatively coupled to a customer device via a network; and
    a processor communicatively coupled to the communication interface;
    wherein the processor:
    sends, using the communication interface, a message to a browser on the customer device, wherein the message includes a first link,
    receives, using the communication interface, a request from the browser to perform a transaction in response to the customer device enabling the first link, wherein the request includes details of the transaction,
    generates a second link and at least one unique token in response to receiving the request, wherein the unique token comprises a value associated with the transaction,
    transmits, using the communication interface, the second link and the at least one unique token to the browser,
    receives, using the communication interface, a response email that is generated in response to the customer device enabling the second link, wherein the response email includes a unique token,
    performs an authentication of the response email,
    decodes the at least one unique token to form a decoded token, and
    processes the transaction based on the decoded token, on a condition that the authentication is approved.

10. The e-commerce system of claim 9, wherein the authentication includes at least one of Sender Policy Framework (SPF) and Domain Keys Identified Mail (DKIM) validations.

11. The e-commerce system of claim 9, wherein the transaction is a payment.

12. The e-commerce system of claim 9, wherein the transaction is access to a secure server.

13. The e-commerce system of claim 9, wherein the processor further calculates an amount of the transaction based on information stored in the unique token.

14. The e-commerce system of claim 9, wherein the unique token is a bulk token used in a direct-to-purchase scenario.

15. The e-commerce system of claim 9, wherein the processor further transmits, using the communication interface, a confirmation message to the customer device and vendor.

16. The e-commerce system of claim 15, wherein the confirmation message causes the browser of the customer device to display a page indicating that the transaction was performed.

17. A non-transitory computer readable storage medium storing instructions for improving security of an e-commerce system, the instructions when executed by a processor of the e-commerce system causes the processor to execute a method that comprises:
  sending, by the e-commerce system, a message to a browser of a customer wherein the message includes a first link;
  receiving, by the e-commerce system, a request from the browser to perform a transaction in response to the customer enabling the first link, wherein the request includes details of the transaction;
  generating, by the e-commerce system, a second link and at least one unique token in response to receiving the request, wherein the unique token comprises a value associated with the transaction;
  transmitting, by the e-commerce system, the second link and the at least one unique token to the browser;
  receiving, by the e-commerce system, a response email that is generated in response to the customer enabling the second link, wherein the response email includes a unique token; and
  performing, by the e-commerce system, an authentication of the response email;
  decoding, by the e-commerce system, the unique token to form a decoded token; and
  processing, by the e-commerce system, the transaction based on the decoded token, on a condition that the authentication is approved.

18. The non-transitory computer readable storage medium of claim 17, wherein the authentication includes at least one of Sender Policy Framework (SPF) and Domain Keys Identified Mail (DKIM) validations.

19. The non-transitory computer readable storage medium of claim 17, wherein the method further comprises:
  transmitting a confirmation message to the customer and vendor.

20. The non-transitory computer readable storage medium of claim 19, wherein the confirmation message causes the browser of the customer to display a page indicating that the transaction was performed.

* * * * *